(12) United States Patent
Ishii

(10) Patent No.: US 10,848,631 B2
(45) Date of Patent: Nov. 24, 2020

(54) READING DEVICE AND IMAGE FORMING APPARATUS

(71) Applicant: Tatsuya Ishii, Kanagawa (JP)

(72) Inventor: Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/578,411

(22) Filed: Sep. 23, 2019

(65) Prior Publication Data
US 2020/0099812 A1    Mar. 26, 2020

(30) Foreign Application Priority Data

Sep. 26, 2018  (JP) ................................ 2018-179740
Mar. 19, 2019  (JP) ................................ 2019-050729

(51) Int. Cl.
*H04N 1/00*   (2006.01)

(52) U.S. Cl.
CPC ....... *H04N 1/00748* (2013.01); *H04N 1/0066* (2013.01); *H04N 1/00718* (2013.01)

(58) Field of Classification Search
CPC ................. G06F 3/044; G06F 3/04883; G06F 2203/04101; G06F 3/03547;
(Continued)

(56) References Cited

U.S. PATENT DOCUMENTS

| 4,975,789 A * | 12/1990 | Sahora ............... G11B 23/0875 360/72.1 |
| 7,369,284 B1 * | 5/2008 | Inuzuka ................. H04N 9/045 348/E9.01 |

(Continued)

FOREIGN PATENT DOCUMENTS

| EP | 3229467 | 10/2017 |
| JP | 10-093787 | 4/1998 |

(Continued)

OTHER PUBLICATIONS

European Search Report dated Feb. 25, 2020, issued in corresponding European Patent Application No. 19199290.8, 11 pages.

(Continued)

*Primary Examiner* — Negussie Worku
(74) *Attorney, Agent, or Firm* — Xsensus LLP

(57) ABSTRACT

A reading device is configured to detect an edge position of a target object to be conveyed in a conveyance direction. The edge position is a position of an edge of the object in a width direction intersecting the conveyance direction. The reading device includes a sensor device, an adder, and an edge position detector. The sensor device includes a pixel array including a plurality of elements arranged in the width direction. The adder is configured to add detection signals output from the elements at respective positions in the width direction. The edge position detector is configured to detect the edge position on basis of a position at which an output of the adder changes to a value larger than a threshold. Each element is configured to output a detection signal based on a reception amount of light in one of different wavelength bands.

9 Claims, 35 Drawing Sheets

(58) Field of Classification Search
CPC .......... G06F 2203/04808; G06F 3/041; G06F 3/047; G06F 3/0488; G06F 3/038; G06F 3/0383; G06F 3/0414; G06F 3/0486; G06F 3/04892; G06K 9/00335; H04N 1/0066; H04N 1/00702; H04N 1/00718; H04N 1/00721; H04N 1/00734; H04N 1/00748; H04N 1/00774; H04N 1/047; H04N 1/387; H04N 1/3877; H04N 1/3878; H04N 1/4097; B65H 2511/521; B65H 2553/416; B65H 7/10; B65H 7/14; G03G 15/6555; G03G 15/6564; G03G 15/6573; G03G 2215/00561
USPC ........................................ 358/448, 488, 474
See application file for complete search history.

(56) References Cited

U.S. PATENT DOCUMENTS

| | | | |
|---|---|---|---|
| 8,851,469 | B2 | 10/2014 | Adachi |
| 9,420,136 | B1* | 8/2016 | Misaka ............... H04N 1/00708 |
| 2002/0071135 | A1* | 6/2002 | Takeda ............... H04N 1/00002 |
| | | | 358/1.14 |
| 2006/0187214 | A1* | 8/2006 | Gillespie ............. G06F 3/03547 |
| | | | 345/173 |
| 2008/0122166 | A1 | 5/2008 | Fukube |
| 2008/0317454 | A1* | 12/2008 | Onuki ..................... G02B 7/08 |
| | | | 396/128 |
| 2013/0258369 | A1* | 10/2013 | Suzuki ................. G06K 15/027 |
| | | | 358/1.9 |
| 2014/0009802 | A1 | 1/2014 | Tanaka |
| 2015/0326838 | A1* | 11/2015 | Kawai .................... H04N 9/045 |
| | | | 348/280 |
| 2015/0338812 | A1 | 11/2015 | Miura |
| 2016/0205282 | A1* | 7/2016 | Metcalfe .............. H04N 1/6027 |
| | | | 358/448 |
| 2017/0134612 | A1* | 5/2017 | Mita .................... H04N 1/6008 |
| 2017/0331968 | A1* | 11/2017 | Togashi ............. H04N 1/00713 |
| 2018/0131828 | A1* | 5/2018 | Suzuki ............... H04N 1/00708 |
| 2018/0220027 | A1* | 8/2018 | Kusuhata ........... H04N 1/00689 |
| 2019/0166274 | A1 | 5/2019 | Ishii et al. |
| 2019/0166275 | A1 | 5/2019 | Ishii et al. |
| 2019/0199874 | A1* | 6/2019 | Oka .................... H04N 1/00708 |

FOREIGN PATENT DOCUMENTS

| | | |
|---|---|---|
| JP | 2008-003286 | 1/2008 |
| JP | 2014-236260 | 12/2014 |
| JP | 2019-103119 | 6/2019 |
| JP | 2019-103120 | 6/2019 |
| JP | 2019102932 A | 6/2019 |

OTHER PUBLICATIONS

U.S. Appl. No. 16/356,667, filed Mar. 18, 2019, Tatsuya Ishii, et al.

* cited by examiner

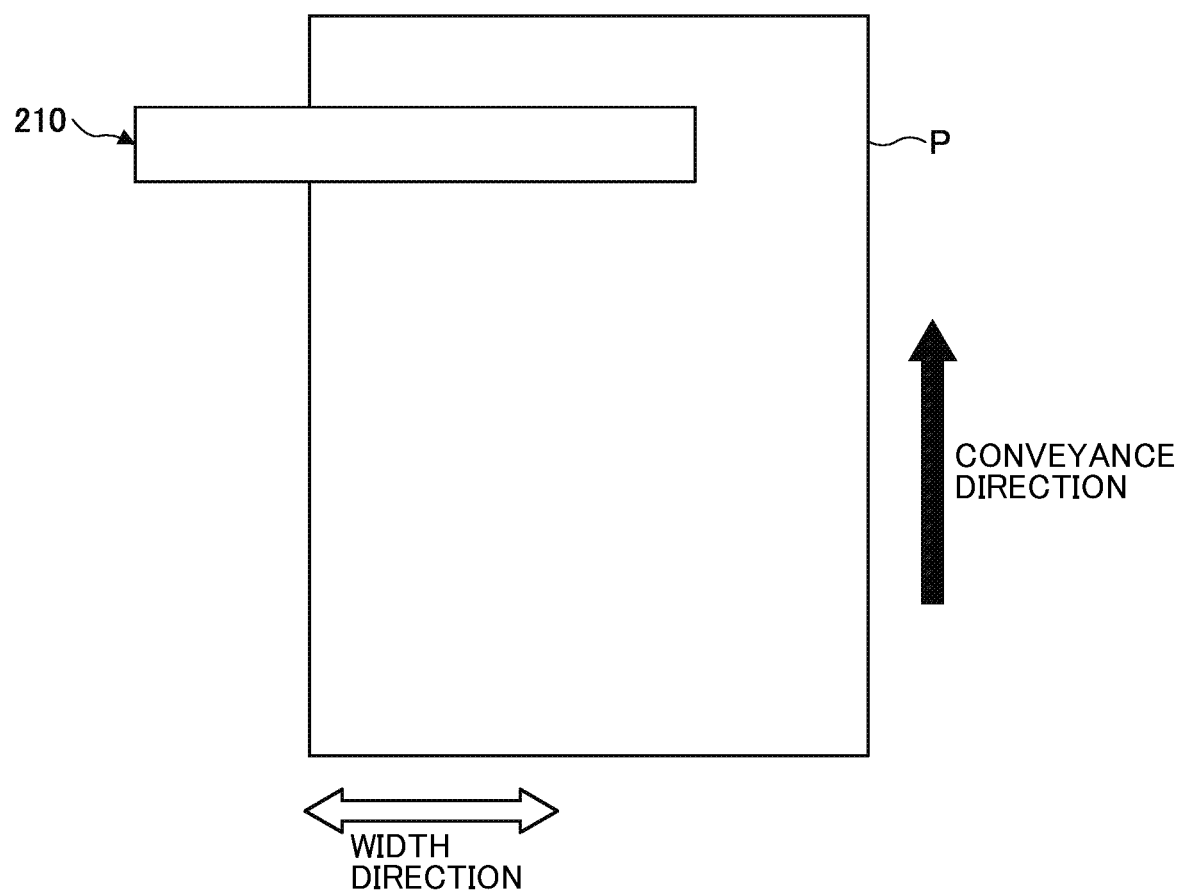

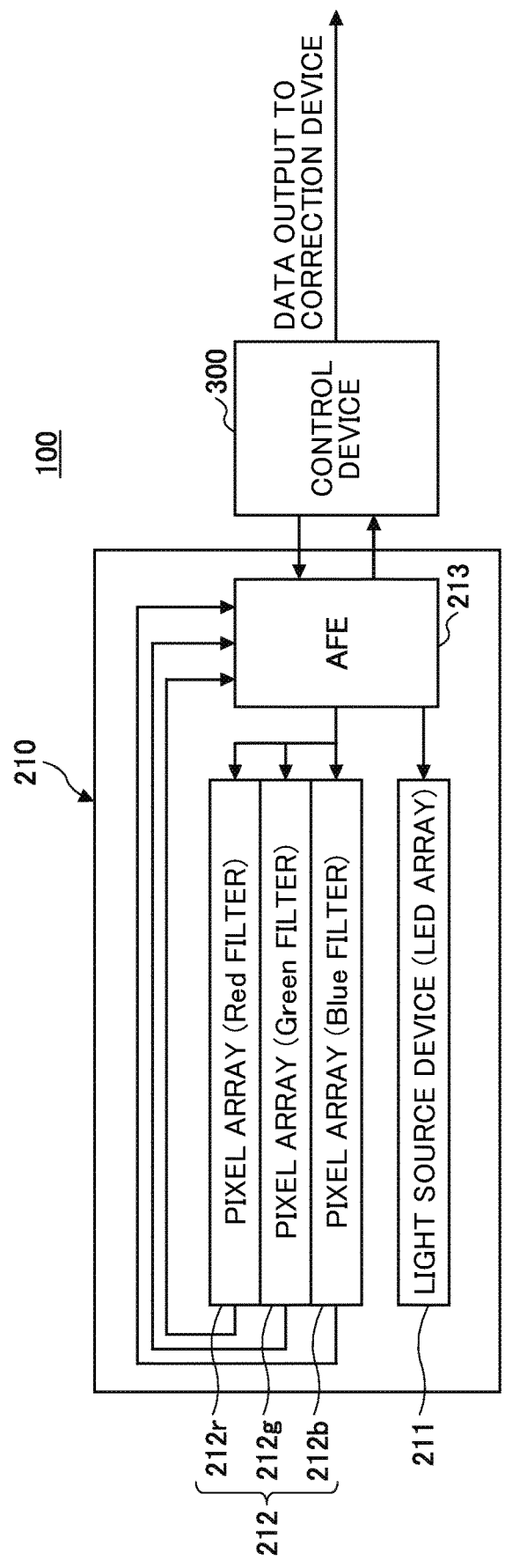

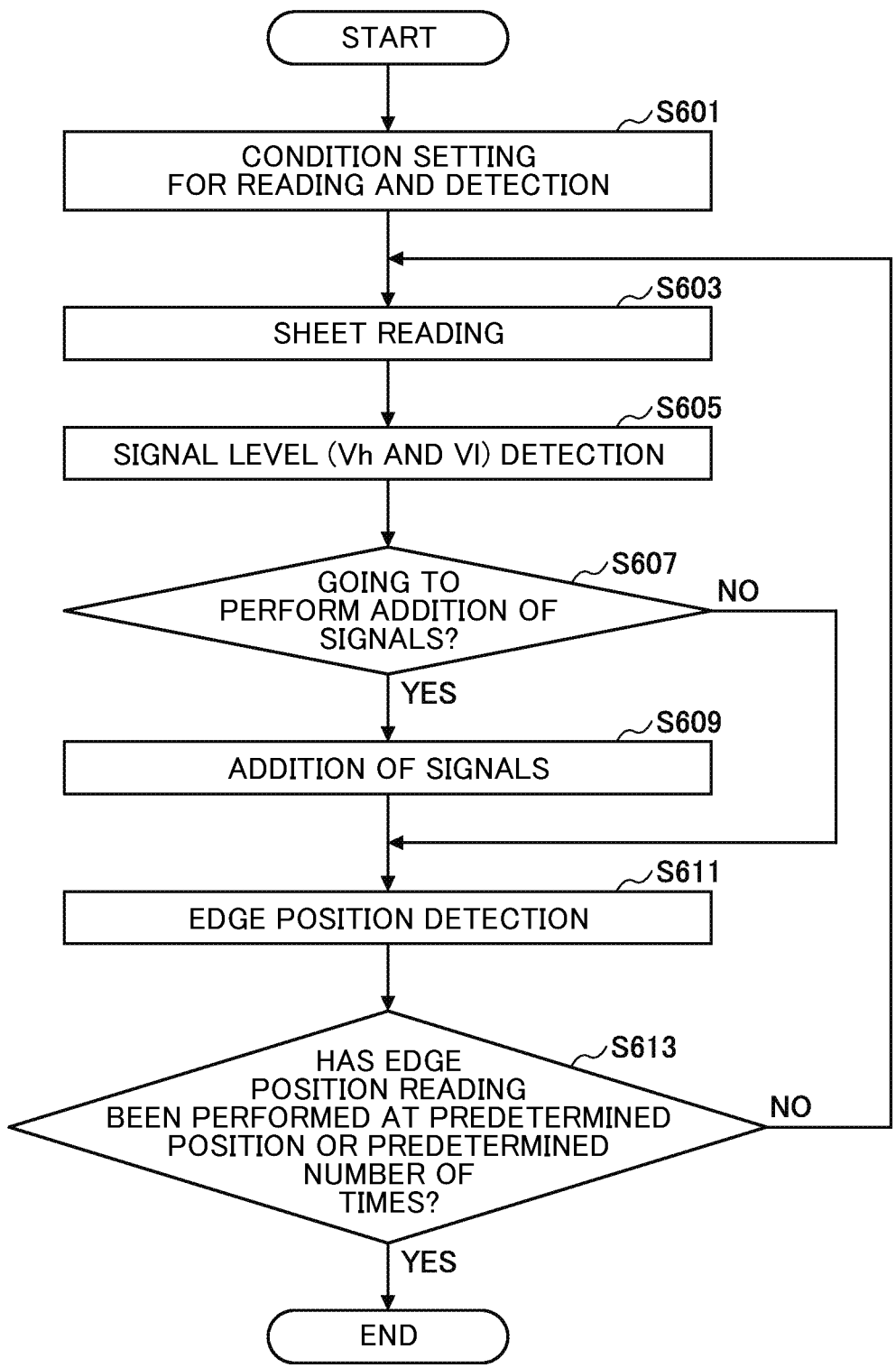

FIG. 34

| EDGE DETECTION CONDITION N | EMISSION AMOUNT | PRESENCE OR ABSENCE OF RGB ADDITION/ DETECTION COLOR | THRESHOLD |
|---|---|---|---|
| 0 | EMISSION AMOUNT 1 | NO ADDITION : R | THRESHOLD 1 |
| 1 | EMISSION AMOUNT 1 | NO ADDITION : G | THRESHOLD 1 |
| 2 | EMISSION AMOUNT 1 | NO ADDITION : B | THRESHOLD 1 |
| 3 | EMISSION AMOUNT 2 | ADDITION | THRESHOLD 2 |
| 4 | EMISSION AMOUNT 3 | ADDITION | THRESHOLD 2 |
| 5 | EMISSION AMOUNT 3 | ADDITION | THRESHOLD 2 |
| 6 | EMISSION AMOUNT 3 | ADDITION | THRESHOLD 3 |

READING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application Nos. 2018-179740, filed on Sep. 26, 2018, and 2019-050729, filed on Mar. 19, 2019, in the Japan Patent Office, the entire disclosure of each of which is hereby incorporated by reference herein.

BACKGROUND

Technical Field

Aspects of the present disclosure relate to a reading device and an image forming apparatus.

Related Art

For example, an image forming apparatus sequentially switches and turns on a plurality of light sources having different wavelengths, and detects an end position of a sheet in a width direction using reflected light, from the sheet, of light appropriate for the color of the sheet, so as to achieve high accuracy detection of the end position of a transfer sheet.

In another example, an image forming apparatus calculates the number of edge pixels of read image data obtained by reading an opposing member in a case where a document sheet has not been conveyed to a reading position, and compares this number with a reference number of edge pixels in order to determine whether dirt and similar substance are attached to an opposing surface of a document pressing member. In a case where the calculated number of edge pixels and the reference number of edge pixels do not match within a prescribed number, the mode shifts to a cleaning mode for cleaning the opposing surface of the document pressing member.

SUMMARY

In an aspect of the present disclosure, there is provided a reading device is configured to detect an edge position of a target object to be conveyed in a conveyance direction. The edge position is a position of an edge of the target object in a width direction intersecting the conveyance direction. The reading device includes a sensor device, an adder, and an edge position detector. The sensor device includes a pixel array. The pixel array includes a plurality of elements arranged in the width direction and configured to output detection signals. The sensor device is disposed to read the edge position. The adder is configured to add the detection signals output from the plurality of elements of the pixel array at respective positions in the width direction. The edge position detector is configured to detect the edge position of the target object in the width direction of the target object on basis of a position at which an output of the adder changes to a value larger than a threshold. Each of the plurality of elements is configured to output a detection signal based on a reception amount of light in one of different wavelength bands.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a view illustrating a positional relationship between the sensor device and a sheet in the edge position reading device according to the first embodiment;

FIG. 4 is a block diagram illustrating a hardware configuration of the edge position reading device according to the first embodiment;

FIG. 6 is a flowchart illustrating processing of the control device in the edge position reading device according to the first embodiment;

FIG. 34 is an example of a reading condition at the time of edge detection processing;

Figure 1:
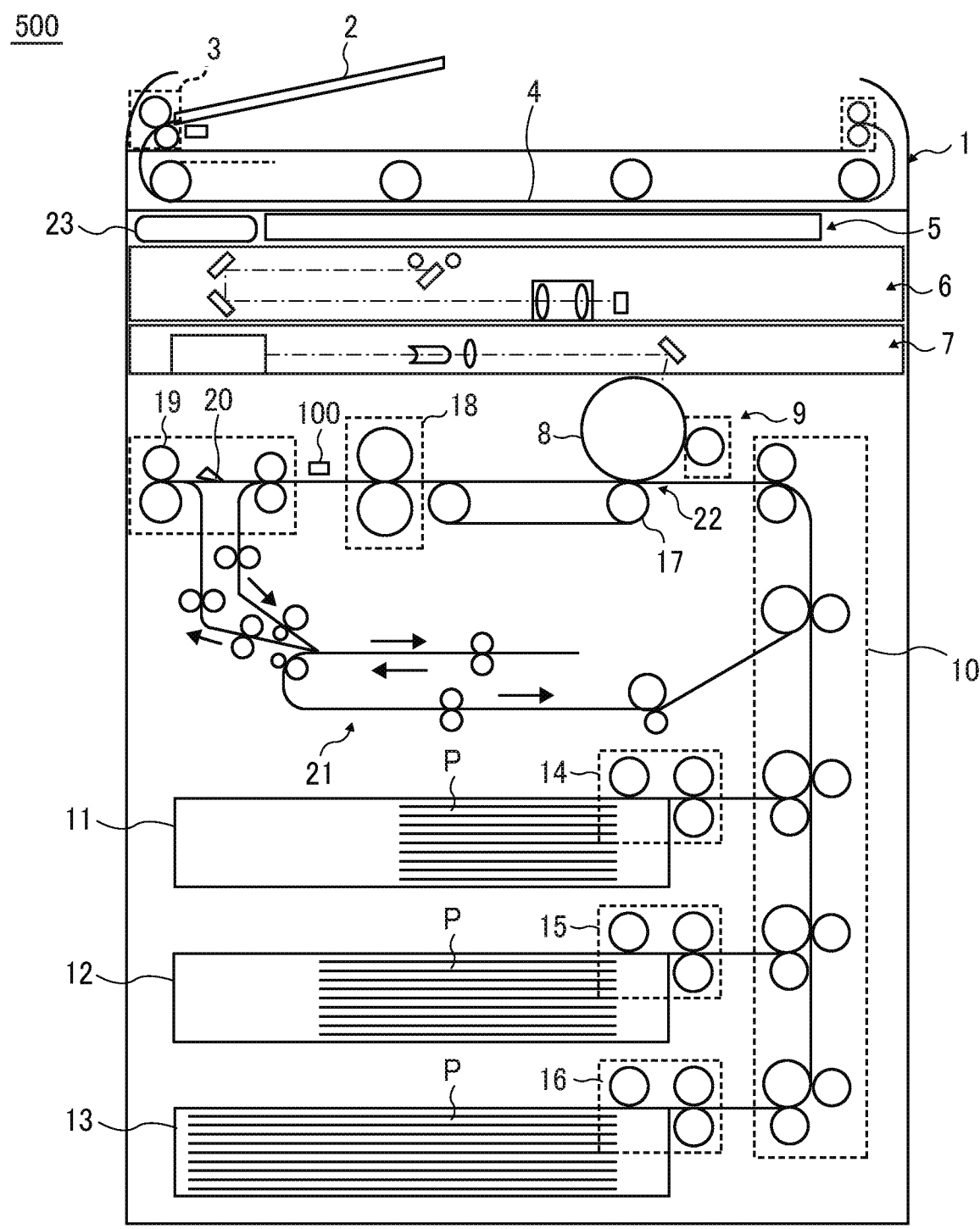
FIG. 1 is a view illustrating a configuration of an image forming apparatus including an edge position reading device according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, modes for carrying out the invention will be described with reference to the drawings. In the drawings, the same reference numerals are given to the same components, and redundant explanation is omitted in some cases.

First Embodiment

FIG. 1 is a cross-sectional view illustrating a configuration of an image forming apparatus 500 including an edge position reading device 100 according to a first embodiment.

Above the image forming apparatus 500, an automatic document feeder 1 having a document table 2 is provided. A document bundle placed on the document table 2 is fed to a predetermined position on a contact glass member 5 by a feeding roller 3 and a feeding belt 4 sequentially from a lowermost document when a print key is pressed.

A scanner 6 optically reads a document fed onto the contact glass member 5 to obtain image data. Based on image data obtained by the scanner 6, a writing device 7 emits laser light on a surface of a photoconductor 8 and forms an electrostatic latent image. The electrostatic latent image formed on the surface of the photoconductor 8 is turned into a toner image by a developing unit 9.

Sheets P stored in sheet trays 11, 12, and 13 are fed by sheet feeders 14, 15, and 16, respectively, and conveyed by a conveyance unit 10. The toner image formed on the surface of the photoconductor 8 is transferred onto the sheet P at a transfer position (also referred to as image forming position) 22 being an example of an image forming portion between the photoconductor 8 and the transfer unit 17. The sheet P on which the toner image has been transferred is conveyed to the fixing unit 18, heated and pressed to allow the toner image to be fixed on the surface of the sheet P. The sheet P having passed through the fixing unit 18 is discharged to an outside of the equipment by the sheet discharging unit 19.

In a case where double-sided printing is performed, the sheet P having passed through the fixing unit 18 is switched in the conveyance path by a separator 20 and is then stocked in a double-sided sheet feeding and conveying unit 21. The sheet P stored in the double-sided sheet feeding and conveying unit 21 is reversed and conveyed again to the photoconductor 8, and then, a toner image is formed on the back surface, and thereafter discharged to the outside of the equipment.

The image forming apparatus 500 further includes an operation panel (also referred to as display panel) 23. The operation panel 23 receives various types of inputs corresponding to user's operation and together with this, displays various types of information (for example, information indicating received operation, information indicating an operation status of the image forming apparatus 500, or information indicating a setting state of the image forming apparatus 500).

That is, the operation panel 23 is an example of an input receiving unit and an example of a display unit. Examples of the operation panel 23 include, but are not limited to, a liquid crystal display (LCD) equipped with a touch panel function. For example, the operation panel 23 may include an organic Electro-Luminescence (EL) display device equipped with a touch panel function. Furthermore, in addition to or instead of this, it is possible to receive an input using a hardware key or to display information using a lamp or the like. The above-described print key is provided on the operation panel 23, for example. Note that FIG. 1 is a cross-sectional view of the image forming apparatus 500, in which the operation panel 23 is illustrated as exposed to the outside of the image forming apparatus 500 so that the user can operate the operation panel 23.

The image forming apparatus 500 includes a sheet edge position reading device 100 in the conveyance path of the sheet P. The edge position reading device 100 reads an edge position of the sheet P to be conveyed, and grasps a conveyance position of the sheet P. The image forming position is adjusted in accordance with the conveyance position of the sheet P, leading to prevention of misalignment of an image on the sheet P.

Figure 2A:
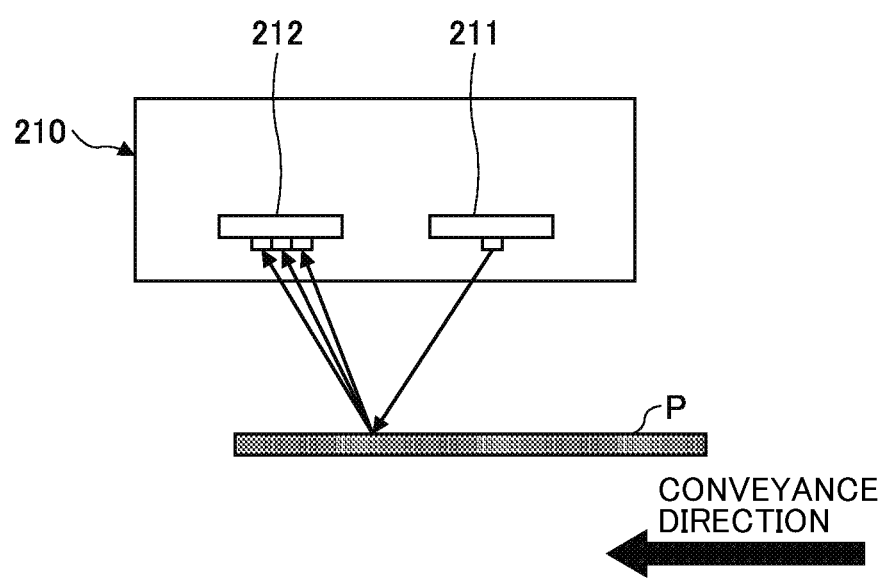
FIGS. 2A and 2B are views illustrating a configuration of a sensor device in the edge position reading device according to the first embodiment.
Figure 2B:
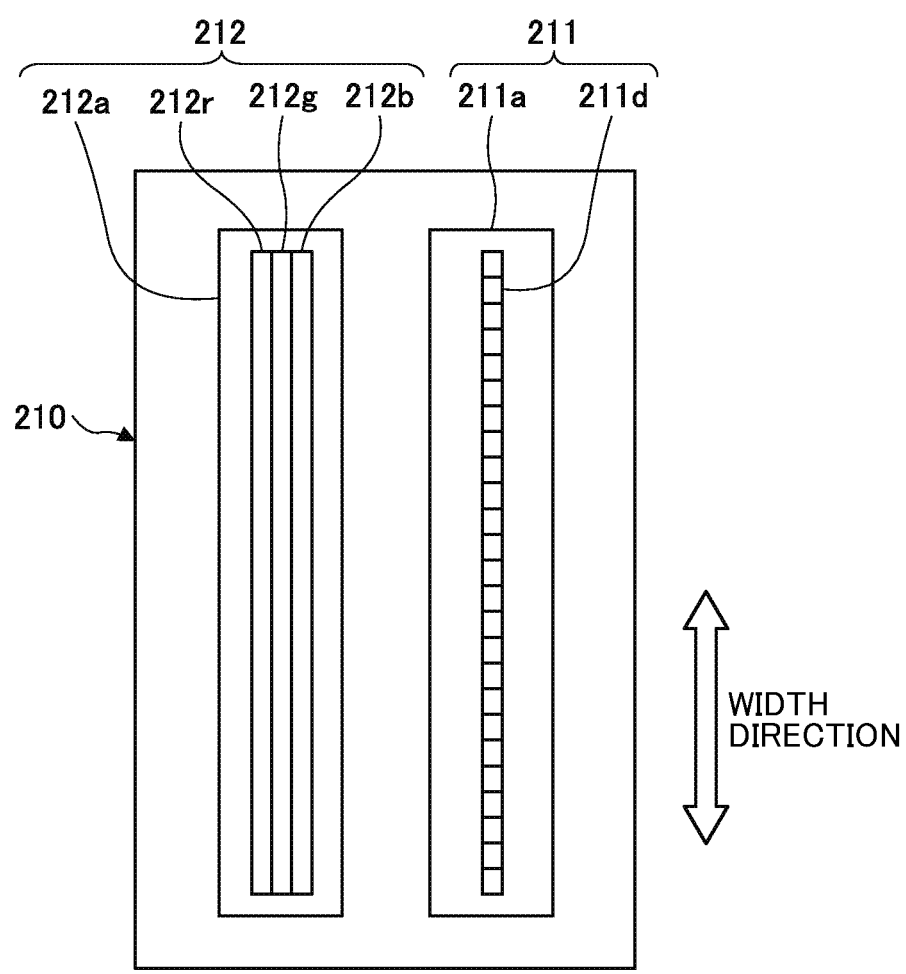
Figure 23:
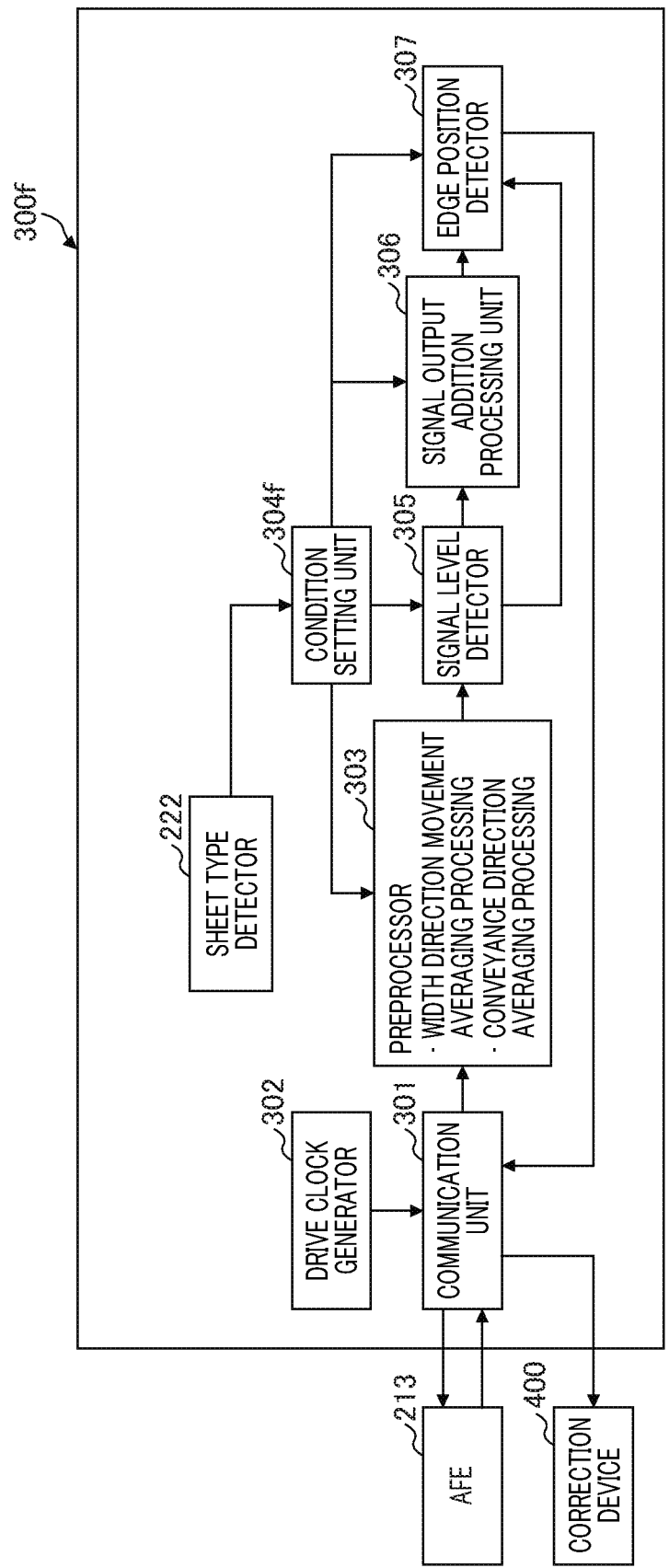
FIG. 23 is a block diagram illustrating a functional configuration of a control device in an edge position reading device according to a seventh embodiment.

Next, an example of a configuration of a sensor device 210 of the sheet edge position reading device 100 according to the present embodiment will be described with reference to FIGS. 2A and 23. FIGS. 2A and 2B are views illustrating an outline of a configuration of the sensor device 210. FIG. 2A is a side view and FIG. 2B is a plan view. In FIGS. 2A and 23, thick black arrows represent a conveyance direction of the sheet P, and hollow thick arrows represent a direction intersecting the conveyance direction of the sheet P, that is, a width direction. The width direction is a typical example of a "predetermined direction". The sensor device 210 includes a light source device 211 and a light receiving device 212.

The light source device 211 emits line-shaped light that is long in the width direction to one end in the width direction of the sheet P to be conveyed, that is, onto a region being a passage of the edge. The light source device 211 includes a light emitting diode (LED) array 211d and a substrate 211a. A plurality of LEDs to emit light having a wide wavelength band close to white light is arranged in the width direction on the substrate 211a.

However, the light source device 211 is not limited to the above configuration, and may simultaneously turn on multicolor LEDs of red, green, and blue, may mix light of individual colors, and may emit light having a wide wavelength band close to white light. Alternatively, it is allowable to have a configuration including one element that emits long line-shaped light in the width direction, such as a fluorescent tube, for example. With use of the fluorescent tube, it is possible to emit white light having uniform brightness in the width direction.

Still alternatively, it is allowable to use a light guide member having its longitudinal direction in the width direction, and turn on white, red, green, and blue LEDs disposed at both ends of the light guide member to let the light guide member to pass so as to emit line-shaped light. The light guide member can be used to emit light with uniform brightness in the width direction. In addition to these, the light source device 211 may have a different configuration from the above-described example as long as line-shaped light can be emitted in the width direction. Still alternatively, a light guide lens may be provided to efficiently guide the light from the LED array 211d to a region being a passage of the edge in the width direction of the sheet P to be conveyed.

The light receiving device 212 includes a substrate 212a, a pixel array 212r that receives red light, a pixel array 212g that receives green light, and a pixel array 212b that receives blue light.

The pixel array is a device in which photoelectric conversion elements for converting light signals into electrical signals, for example, photodiodes (PD), are arrayed in the width direction. One photoelectric conversion element corresponds to one pixel, and outputs an electrical signal based on the amount of light received. The "electrical signal based on the amount of light received" is a typical example of a detection signal. The pixel array outputs electrical signals of pixels for one line.

As illustrated in the figure, each of the pixel array 212r, the pixel array 212g, and the pixel array 212b is arranged in the conveyance direction such that the width direction and the pixel arrangement direction are substantially parallel.

The pixel array 212r that receives red light includes a red color filter in front of a light receiving surface, and receives red light that has passed through the color filter. The red color filter allows passage of light in the red wavelength band and absorbs or reflects light in other wavelength bands.

Similarly, the pixel array 212g and the pixel array 212b includes green and blue color filters, respectively, so as to receive light in the green and blue wavelength bands, respectively. The color filter that allows passage of red, green, or blue light is a typical example of a "red, green, or blue color selector".

Note that the pixel array may use charge coupled device (CCD), a complementary metal-oxide-semiconductor (CMOS), or the like. The light receiving device 212 may include a CCD or CMOS area sensor having a two-dimensional pixel array. Furthermore, in order to increase light collection efficiency of the light receiving device 212, a lens array such as a rod lens array may be provided to guide the light reflected by the sheet P to the pixel array.

The sensor device 210 emits line-shaped near-white light from the light source device 211 onto a region being a passage of the edge in the width direction of the sheet P. Subsequently, reflected light from the region being a passage of the edge in the width direction of the sheet P is received by the light receiving device 212. Among the reflected light, red light is received by the pixel array 212r, green light is received by the pixel array 212g, and blue light is received by the pixel array 212b.

In a case where simply monochromatic light is emitted and then reflected light is received, the emitted light might sometimes be absorbed by the sheet P and sufficient reflected light might not be obtained depending on the color of the sheet P. In the present embodiment, however, near-white light is emitted and red, green, and blue light beams are received, making it possible to increase the color and type of sheet P on which edge position reading is possible, compared to the case where simply monochromatic light is used.

However, the configuration for obtaining such an effect is not limited to the above. For example, three LED arrays of red, green, and blue may be used as light sources, and light of individual colors may be received by time division by one pixel array while sequentially turning on each of LED arrays. This configuration also makes it possible to increase the color and the type of the sheet P similarly to the above.

Furthermore, the sensor device 210 may include a contact image sensor (CIS). The CIS is an image sensor integrating a light receiving device, a light source device, and a rod lens array (equal magnification imaging system lens). With the use of the CIS, it is possible to approach the surface of the sheet to achieve an effect of successfully reading the edge position with a compact design.

FIG. 3 illustrates an example of a positional relationship between the sensor device 210 and the sheet P in the edge position reading device 100. In FIG. 3, the sheet P is conveyed in the direction of a thick black arrow. The sensor device 210 is provided so as to straddle one end, that is, an edge of the sheet P in the width direction indicated by the white arrow. The position in the width direction of the edge of the sheet P straddling the sensor device 210 is read by the sensor device 210. The "sensor device 210 provided so as to straddle one end of the sheet P, that is, an edge in the width direction" is a typical example of the "a sensor device arranged so as to be able to read an edge of a target object".

Next, a hardware configuration of the edge position reading device 100 will be described with reference to the block diagram of FIG. 4. The edge position reading device 100 includes a sensor device 210 and a control device 300. The edge position reading device 100 operates in accordance with an instruction from the control device 300.

The sensor device 210 includes the light source device 211, the light receiving device 212, and an analog front end (AFE) 213. The AFE 213 is an analog circuit connecting a signal detection device such as a sensor with a digital signal processing device such as a microcomputer or an electronic hardware circuit. The AFE 213 outputs a drive signal to the light receiving device 212 and the light source device 211 at a predetermined timing in accordance with an instruction from the control device 300.

The light source device 211 is turned on or off in response to an input of the drive signal from the AFE 213. When the light source device 211 is turned on, it emits line-shaped light long in the width direction with a predetermined light amount.

When a drive signal is input from the AFE 213, the light receiving device 212 outputs, to the AFE 213, an analog voltage signal corresponding to one line elongated in the width direction obtained by photoelectrically converting the received light on each of pixels of the pixel array. When an analog voltage signal is input from the pixel array of the light receiving device 212, the AFE 213 executes analog-to-digital (A/D) conversion, and outputs a digital voltage signal of each of pixels to the control device 300.

When a signal is input from the ME 213, the control device 300 executes pixel output value addition processing, edge position detection processing, or the like, which will be described below, and reads the edge position of the conveyed sheet P. Reading results are output to the correction device 400 connected to the post process of the control device 300. The correction device 400 is a device that adjusts mutual positions of the sheet P and an image formed on the sheet P appropriate for each other in accordance with the output of the edge position reading device 100. An example of the correction device 400 is the writing device 7. In this case, the writing device 7 being the correction device 400 to which the reading result has been output adjusts the image forming position of an image on the sheet P conveyed next in accordance with the edge position being the reading result. The correction device 400 is not limited to the writing device 7, and may be a sheet position correction device or the like that corrects the position of the sheet P before reaching the image forming position 22. Although the configuration using the AFE 213 has been described above, the processing performed by the AFE 213 may be executed by a driver circuit of an LED, a driver circuit of a pixel array, an A/D converter, a circuit combining these, or the like.

The control device 300 includes a Field-Programmable Gate Array (FPGA), for example. However, part or all of the processing performed by the FPGA may be executed by a central processing unit (CPU), an application specific integrated circuit (ASIC), or the like. The control device 300 may include a memory such as a read only memory (ROM) or a random access memory (RAM). For example, using the RAM as a work memory, the control device 300 follows a program preliminarily stored in the ROM and executes control of the light source device 211 and output processing of the pixel read by the light receiving device 212. The control device 300 may include a non-volatile storage medium for storing setting values or the like, such as a hard disk drive (HDD), for example, used for control by the control device 300.

Although the above is a configuration example in which the control device 300 is provided outside the sensor device 210, the configuration is not limited to this example. The sensor device 210 may include the control device 300. The image forming apparatus or the correction device 400 or the like in the post process may include the control device 300.

Although the sensor device 210 includes the AFE 213 in the above-described configuration, the AFE 213 may be provided outside the sensor device 210, or a correction device or the like in the post process may include the AFE 213.

The control device 300 can implement a functional configuration described below with the above hardware configuration.

Figure 5:
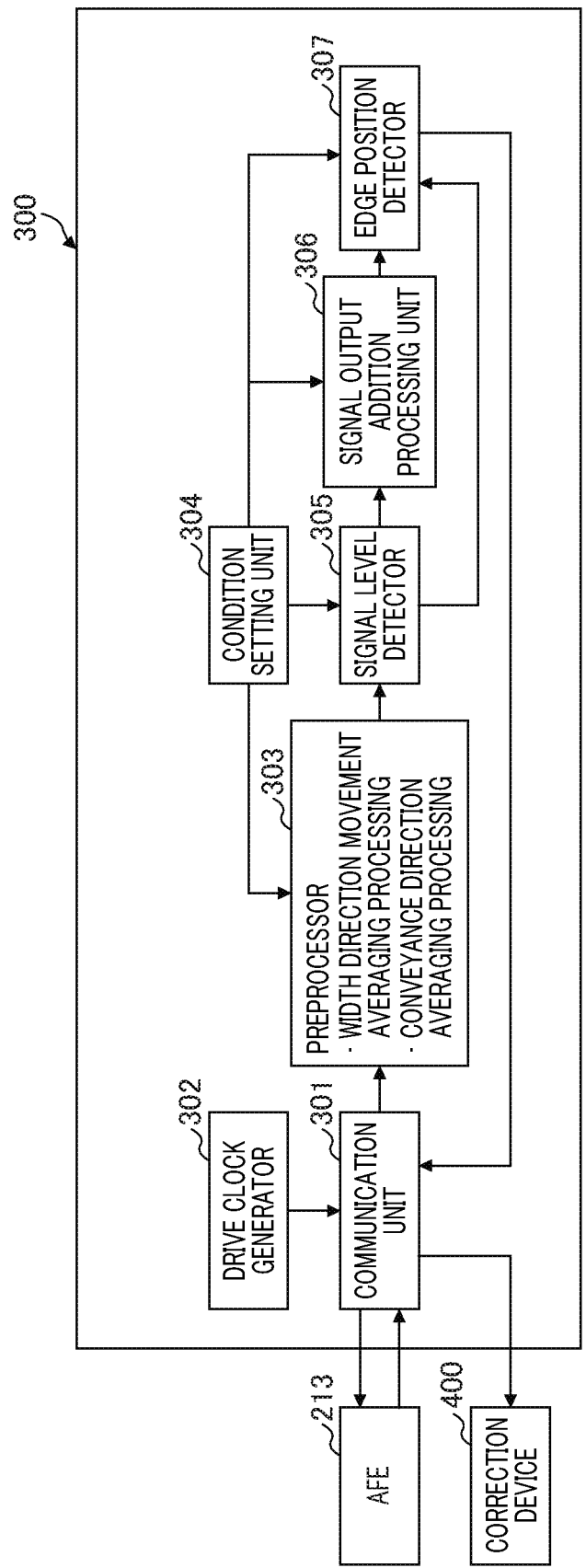
FIG. 5 is a block diagram illustrating a functional configuration of a control device in the edge position reading device according to the first embodiment.

FIG. 5 is a block diagram illustrating an example of a functional configuration of the control device 300. The control device 300 includes a communication unit 301, a drive clock generator 302, and a preprocessor 303. The control device 300 further includes a condition setting unit 304, a signal level detector 305, a signal output addition processing unit 306, and an edge position detector 307.

The communication unit 301 performs communication to achieve control of devices connected to the control device 300, such as the AFE 213 and the correction device, and achieve input and output of data. For example, serial communication is used as a communication method.

The drive clock generator 302 generates a drive clock signal, and outputs the generated drive clock signal to the AFE 213 via the communication unit 301. The light source device 211 and the light receiving device 212 in the sensor device 210 are controlled via the AFE 213 at timing based on the generated drive clock signal.

The preprocessor 303 performs, for example, processing for removing output noise as preprocessing for the processing of pixel output read by the sensor device 210. The preprocessing includes width direction moving averaging processing, and conveyance direction averaging processing, for example.

The width direction moving averaging processing is processing of averaging output values of pixels adjacent in the width direction in the pixel array of the light receiving device 212 while shifting sections. For example, an average value of output values of seven adjacent pixels is obtained at a pixel at a certain position in the width direction, and this average value is set as an output value of the pixel. This processing can be used to remove or reduce output noise due to dirt attached to the light receiving surface, shot noise, thermal noise, or the like, for each of pixels. In addition, the use of a rod lens might lead to an occurrence of output noise with reproducibility and periodicity such as an interval of seven pixels, for example. The light collected by the rod lens has an intensity distribution. Accordingly, the above noise is caused by the superposition of intensity distribution for each of rod lenses corresponding to the arrangement of the rod lenses. The width direction moving averaging processing can also remove or reduce such noise.

The conveyance direction averaging processing is processing of averaging output values of pixels in the conveyance direction, that is, in a direction intersecting the width direction. In a case where there is big variation of the output value for each of pixels in the width direction, averaging the output values of the pixels even in the direction intersecting the width direction would remove or reduce the output noise. For example, in a case where a plurality of pixel arrays is provided in the conveyance direction, an average value of output values of pixels adjacent in the conveyance direction is obtained at a pixel at a certain position in the width direction, and this average value is to be used as an output value of the pixel. In a case Where a plurality of pixel arrays is not provided in the conveyance direction, a plurality of output values is obtained by time division at a pixel at a certain position in the width direction while conveying the sheet P, and an average value of these is to be used as an output value of the pixel.

Content of preprocessing is not limited to the above, and may be altered in accordance with the noise condition or the like.

The condition setting unit 304 sets conditions for reading the edge position. For example, the width direction moving averaging processing includes setting of preprocessing conditions such as the number of adjacent pixels for averaging output values. In addition, the condition setting unit 304 performs setting of the reading conditions such as the number of times of reading of the edge of the sheet P, the reading position of the edge in the conveyance direction, and timing, and performs setting of edge position detection conditions such as a threshold for detecting the edge position and how to determine the threshold. The input of conditions can be performed, for example, by reading a condition file that has recorded setting data of various conditions from an external storage device such as a universal serial bus (USB) via the communication unit 301. The various conditions to be set may be preliminarily stored in a storage medium such as an HDD of the image forming apparatus 500.

The signal level detector 305 obtains signal levels Vh and Vl of an output value of the pixel. The signal levels Vh and Vl in the present embodiment are, for example, the maximum value and the minimum value among the output values of the pixels of one line of the pixel array arranged in the width direction. The obtained signal levels Vh and Vl are used for calculating a threshold In a case where automatic determination of the threshold is performed. However, the signal levels Vh and Vl are not limited to the above-described maximum value or the minimum value. For example, on the pixel array, even when the sheet is the minimum size sheet out of the conveyed sheet P, an output value of reflected light is obtained using the pixels from which the output value of the reflected light from the sheet is obtained. The signal level Vh may be calculated on the basis of the obtained output value. In a case where the obtained signal level Vh is a predetermined threshold or less, a predetermined value that is preliminarily determined, namely, a fixed value, may be set as the signal level Vh, it is allowable to calculate Vh/2 from the obtained Vh and determine this value as the threshold.

Meanwhile, the signal level Vl may use a predetermined value that is preliminarily determined, namely, a fixed value without performing data acquisition. The signal level Vh is preferably calculated from the obtained data because the signal level Vh varies greatly depending on the sheet P to be conveyed, whereas the signal level Vl is an output value of a background region and thus has little variation of the output value.

The signal output addition processing unit 306 adds the output values of the pixels of the pixel array at each of positions in the width direction. Specifically, for example, an output value of the pixel for red light received by the pixel array 212r, an output value of the pixel for green light received by the pixel array 212g, and an output value of the pixel for blue light received by the pixel array 212b are added up at a certain position in the width direction. The added value is to be output as an output value of the pixel at the specific position.

The output of each of pixels of the pixel array is in the form of a signal, and thus, the output value varies somewhat with time. "The output value of the pixel that varies with time" is an example of "an output signal of the pixel". The signal output addition processing unit 306 is an example of an "adder that adds output signals of the pixels of the pixel array at each of positions in a predetermined direction".

The edge position detector 307 determines a position (coordinates) at which the output value of the adjacent pixel in the width direction changes from a value smaller than a threshold to a value larger than the threshold, and outputs the determined position as an edge position of the sheet P. The edge position detector 307 is an example of "an edge position detector that detects an edge of a target object".

Next, an example of processing performed by the control device 300 will be described with reference to the flowchart of FIG. 6.

First, in step S601, the condition setting unit 304 sets appropriate conditions for reading an edge position. Examples of conditions to be set include the conditions of preprocessing and the conditions of edge detection processing as described above. The condition setting unit 304 outputs a setting value to the preprocessor 303, the signal level detector 305, the signal output addition processing unit 306, and the edge position detector 307, and then, appropriate conditions are set in individual units.

Next, in step S603, the control device 300 issues an instruction to drive the light source device 211 and the light receiving device 212 at timing based on the clock signal generated by the drive clock generator 302. The instruction is issued to the AFE 213 via the communication unit 301. At a predetermined timing on the basis of the drive signal from the AFE 213, the light source device 211 emits light onto a region being a passage of the edge in the width direction of the sheet P being conveyed.

The light receiving device 212 outputs an analog voltage signal of one line of pixels to the AFE 213 at a predetermined timing on the basis of the drive signal from the AFE 213. The AFE 213 executes A/D conversion, and outputs a digital voltage signal of one line of pixels to the control device 300.

The communication unit 301 receives an output signal of pixels for one line as an input, and outputs the signal to the preprocessor 303. The preprocessor 303 executes preprocessing such as width direction moving averaging processing and conveyance direction averaging processing, and outputs a result of the preprocessing to the signal level detector 305.

Next, in step S605, the signal level detector 305 obtains signal levels Vh and Vl in the output value of the pixel for one line. In a case where the threshold determination method for edge detection is set to "automatic determination" by the condition setting unit 304, the signal level detector 305 calculates a threshold for edge detection from the obtained signal levels Vh and Vl. The calculated threshold is input to the edge position detector 307. The calculation is performed by calculating (Vh+Vl)/2, for example. In a case where automatic determination of the threshold is not performed, threshold data recorded in the condition file is input to the edge position detector 307.

Next, in step S607, the signal output addition processing unit 306 determines whether to execute addition processing of the output value of the pixel, on the basis of the values of the signal level Vh and the signal level Vl. That is, the signal output addition processing unit 306 determines that the signal output addition processing is not to be executed in a case when sufficient reflected light is obtained from the sheet P and a difference between the signal level Vh and the signal level Vl is large. When the difference between the signal level Vh and the signal level Vl is small, the signal output addition processing unit 306 determines that the signal output addition processing is to be executed. This determination is not limited to the method using the detection results of the signal level Vh and the signal level Vl. Data such as the type, color, or surface condition of the sheet may be preliminarily recorded in the condition file and determination may be made with reference to the data.

In a case where it is determined in step S607 that the signal output addition processing is to be executed, the signal output addition processing unit 306 adds, in step S609, the output values of the pixel at individual positions in the width direction. That is, for example, the output value of the pixel of the pixel array 212r, the output value of the pixel of the pixel array 212g, and the output value of the pixel of the pixel array 212h are added at individual positions in the width direction. The output value of the pixel for one line obtained by the addition is input to the edge position detector 307.

In a case where it is determined in step S607 that the signal output addition processing is not to be executed, the signal output addition processing would not be executed, and the output value of the pixel for one line of the pixel array would be input to the edge position detector 307. In this case, for example, the output value of the pixel for one line of any one of the pixel array of the pixel array 212r, the pixel array 212g, or the pixel array 212b would be input to the edge position detector 307.

Next, in step S611, the edge position detector 307 determines a position at which the output value of the adjacent pixel in the width direction changes from a value smaller than a threshold to a value larger than the threshold, and outputs the determined position as an edge position of the sheet P.

Next, in a case where the edge positions of a plurality of locations of the sheet P in the conveyance direction are to be read in the set condition, it is determined in step S613 whether the edge positions have been read at a predetermined position or a predetermined number of times. In a case where it is determined in step S613 that the edge position has been read at a predetermined position or a predetermined number of times, the control device 300 finishes the processing. In contrast, in a case where it is determined that the sheet P has not been read, the processing returns to step S603, and the reading of the edge position of the sheet P is executed again. As described below, in a case where the edge positions of a plurality of locations have been read, the inclination of the sheet P is obtained in addition to the position of the sheet P.

The edge position reading device 100 executes the above processing to read the edge position of the sheet P. On the basis of the edge position of the sheet P, the position or inclination of the sheet P is detected. The correction device in the post process corrects the position or inclination of the sheet P on the basis of the detection result.

Next, the data read by the edge position reading device 100 and operation and effects of the edge position reading device 100 will be described with reference to FIGS. 7A to 9C.

Figure 7A:
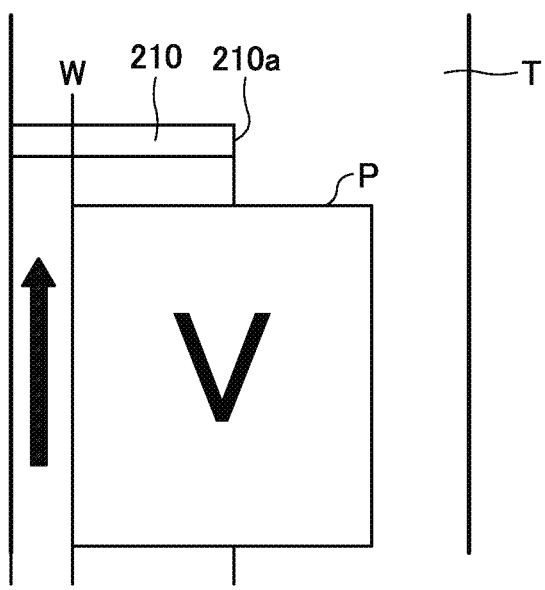
FIGS. 7A to 7D are views illustrating a first example of data read by a conventional edge position reading device.

FIGS. 7A to 7D are views illustrating a state where the edge position reading device 100 reads the edge position of the sheet P and the read data. FIG. 7A illustrates a state where the sheet P is conveyed along a conveyance path T in a direction indicated by the thick black arrow, and an edge W of the sheet P is read by the sensor device 210.

Figure 7B:
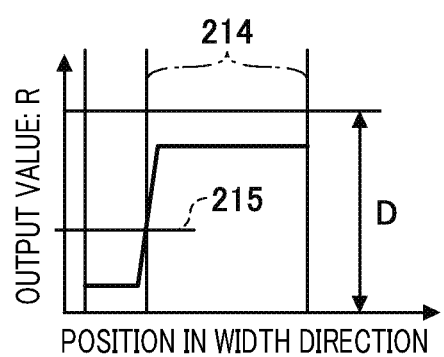
Figure 7C:
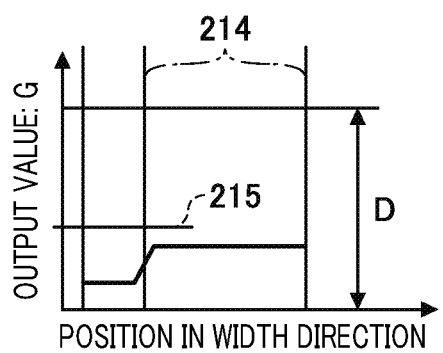
Figure 7D:
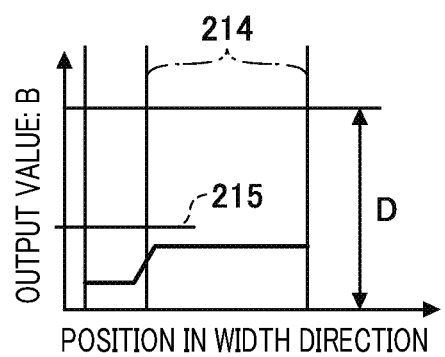
Figure 8A:
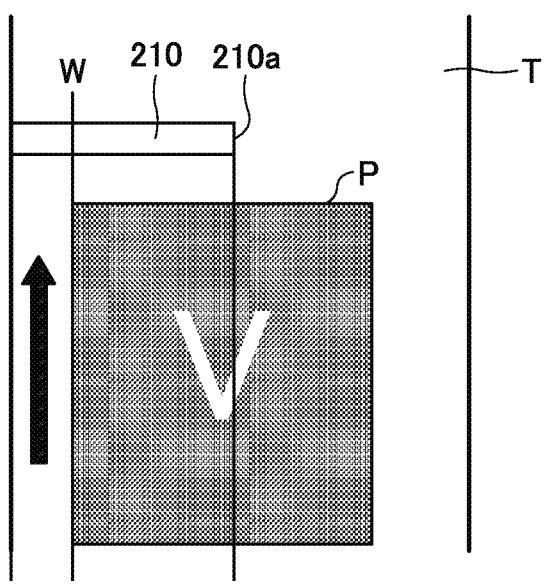
FIGS. 8A to 8D are views illustrating a second example of data read by the conventional edge position reading device.
Figure 8B:
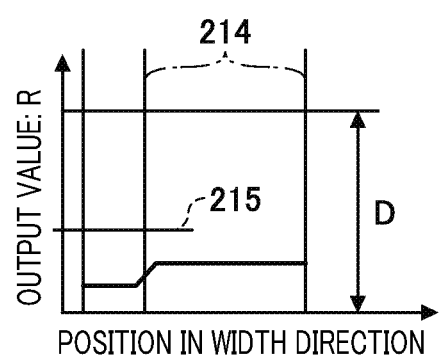
Figure 8C:
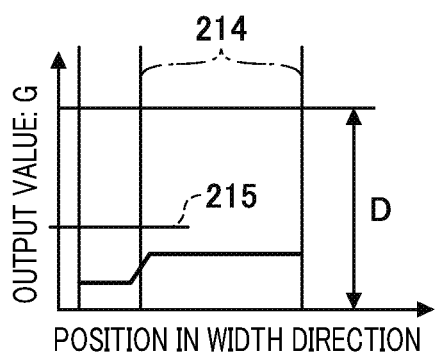
Figure 8D:
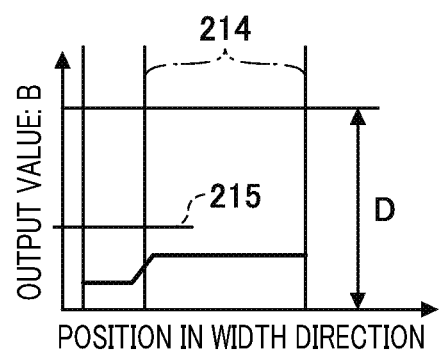

FIG. 7B illustrates an output value of one line of pixels for red light read by the pixel array 212r. The horizontal axis indicates a position (coordinates) of each of pixels of the pixel array in the width direction. The vertical axis indicates an output value of the pixel. The broken line represents the signal level Vh of the output value of the pixel. A signal level difference of the signal level Vh from the signal level Vl is indicated as a range D. Two one-dot chain lines 214 indicate the position of the edge W in the width direction and the position of the one end 210a of the sensor device 210. The dotted line indicates a threshold 215 for edge detection. Similarly, FIGS. 7C and 7D illustrate output values of pixels for one line with respect to green light and blue light read by the pixel array 212g and the pixel array 212h, respectively.

In a region on which light from the light source device 211 has been emitted, the amount of reflected light from a region having no sheet P is small with a small output value of the pixel. In contrast, the amount of reflected light from the region where the sheet P is present is increased by the reflection by the sheet P with a large output value of the pixel. Accordingly, the position in the width direction in which the output value of the pixel changes from a small value to a large value is detected, thereby making it possible to read the position of the edge W of the sheet P in the width direction. The region where no sheet P is present will be hereinafter referred to as a "background region".

Here, conventional position reading for the edge W of the sheet P has been performed using the output value of the pixel for the color with the largest change, out of red, green, and blue. For example, in FIGS. 7A to 7D, the change in the output value of the pixel for red light is greater than the change in the output value of the pixel for green and blue light. This indicates that the color of the sheet P is close to red and the amount of reflected light in red is large. In the example of FIGS. 7A to 7D, the position where the output value of the pixel for red light: R changes from a value smaller than the threshold 215 to a value larger than the threshold 215, thereby making it possible to read the position of the edge W in the width direction.

However, the sheets P might have various colors and surface states, and a sufficient amount of reflected light might not be obtained depending on the sheet. For example, in FIGS. 8A to 8D, the output values of the pixels for red, green, and blue light are all smaller than the threshold 215. This indicates a state where the color of the sheet P is black, and a sufficient amount of reflected light cannot be obtained with any color. This case leads to difficulty in reading the position of the edge of the sheet P.

Figure 9A:
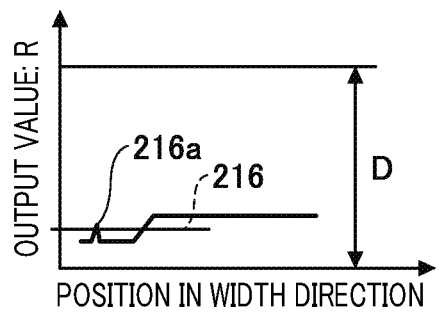
FIGS. 9A to 9C are views illustrating a third example of data read by the conventional edge position reading device.
Figure 9B:
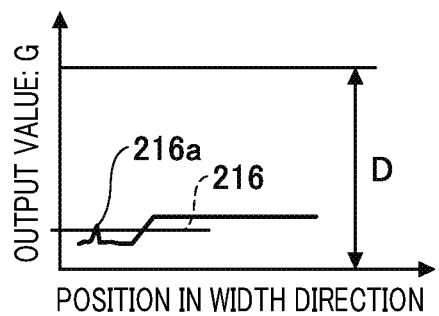
Figure 9C:
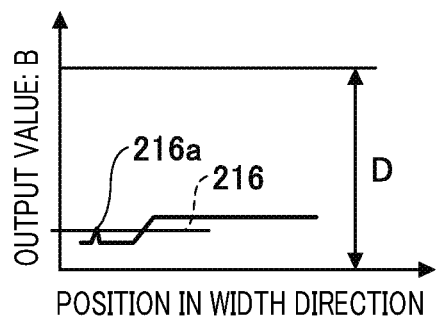

Meanwhile, FIGS. 9A to 9C illustrate a case where the threshold for edge detection is lowered compared to FIGS. 8A to 8D. The dotted line is a threshold 216. In the example of FIGS. 9A to 9C, the output value of the pixel attributed to the reflected light from the sheet P exceeds the threshold 216 for any of red, green, and blue light. However, there are cases where the output value of the pixel increases by noise light due to dirt and similar substance in the background region, even with no sheet. In FIGS. 9A to 9C, a pixel output 216a represents a pixel output due to noise light. Reducing the threshold 216 might lead to a case where the pixel output due to noise light exceeds the threshold, and in such a case, it would not be possible to accurately read the edge position alone.

Figure 10A:
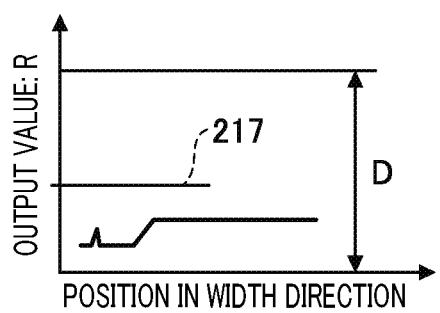
FIGS. 10A to 10D are views illustrating data read by the edge position reading device according to the first embodiment.
Figure 10B:
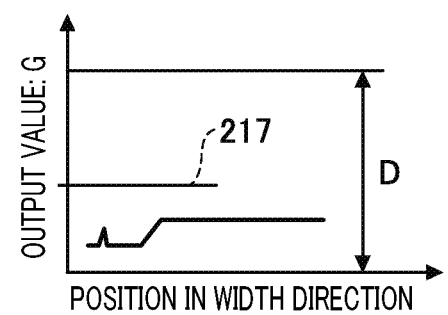
Figure 10C:
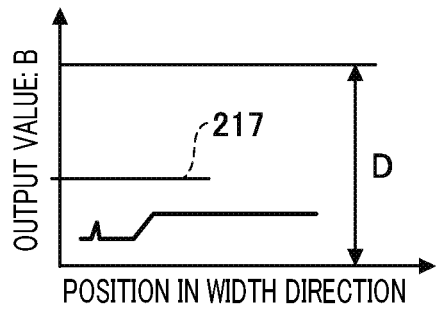
Figure 10D:
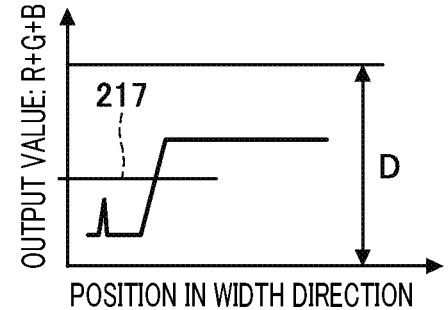

In the edge position reading device 100 according to the present embodiment, the output value of the pixel is added at each of positions in the width direction. For example, among FIGS. 10A to 10D. FIG. 10A illustrates an output value of the pixel for red light, FIG. 10B illustrates an output value of the pixel for green light, FIG. 10C illustrates an output value of the pixel for blue light, and FIG. 10D illustrates sum of output values of the pixel for the light of red, green, and blue at each of positions in the width direction.

Summing the output values of the pixel for the light of three colors would make it possible to increase the output value as compared with the case where a single color alone is used. This configuration would make it possible to prevent a failure in reading the edge of the sheet caused by an insufficient amount of reflected light from the sheet due to the color or a surface state of the sheet. In addition, since it is possible to widen the difference between the output value of the pixel due to noise light and the output value of the pixel attributed to reflected light from the sheet, it is possible to prevent erroneous reading of the edge position of the sheet due to the noise light.

Furthermore, since output values for light of different colors such as red, green, and blue are used as the pixel output value to be added, it is possible to suppress the difference in the amount of reflected light for each of colors of the sheet, achieving reading of the edge of the sheet of various colors.

As described above, according to the edge position reading device 100 of the present embodiment, the edge position of the target object can be read without being restricted by the target object type.

While the present embodiment has an exemplary configuration in which near-white light is emitted and then red, green, and blue light is received by three pixel arrays, the present invention is not limited to this configuration. For example, light may be emitted from three light sources of red, green, and blue, and one pixel array may receive reflected light of each of colors in time division.

The color of light to be used is not limited to red, green, or blue, and other colors such as cyan, magenta, or yellow may be used in substitution or addition. Furthermore, the number of pixel arrays and light sources provided for each of colors may be increased or decreased.

In addition, there is no need to include a light source for emitting light to the target object as long as light from the target object can be received with a sufficiently large output without light emission.

Furthermore, although the above is an example in which the edge in the width direction of the conveyed sheet is read in the image forming apparatus, the present invention is not limited to this example. For example, the present invention can be applied to reading of an edge of an article or sheet-like material to be conveyed, or a moving article or sheet-like material. The present invention is also applicable to the reading of edges in any direction of various target objects such as sheet, sheet-like materials, or articles, which are stationary. The above is an example of using reflected light from a target object. However, when the target object transmits light or allows the light to pass, the edge may be read using transmitted light or passing light of the target object.

Second Embodiment

Next, an example of the edge position reading device according to a second embodiment will be described with reference to FIGS. 11 to 12. In the second embodiment, the description of the same configuration as in the previously described embodiment may be omitted.

First, before an edge position reading device 100a of the second embodiment is described, an influence of reflected light of a background region in the edge position reading device will be described with reference to FIG. 11.

Figure 11:
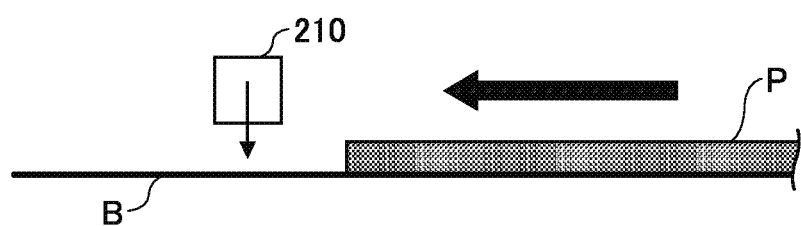
FIG. 11 is a view illustrating influence of reflected light of a background region in an edge position reading device.

FIG. 11 is a schematic view of a state where the sensor device 210 reads an edge position of the sheet P being conveyed in the direction indicated by the thick black arrow, as observed from the side. Here, a background region B is a region where the sheet P is not present out of a region read by the sensor device 210. The background region B includes a belt surface of a conveyance belt for conveying the sheet P, for example. The conveyance belt is a member that conveys the sheet P placed on the belt surface together with movement of the belt surface in the conveyance direction. The sensor device 210 faces the belt surface in the region where there is no sheet P out of the region read by the sensor device 210.

Here, in a case where there is a large amount of reflected light from the background region B, that is, the belt surface while the output value of the pixel in the pixel array is large at the time of light emission to the region where the edge of the sheet P is to be read, the difference with the pixel output value attributed to the reflected light from the sheet P would be small. In particular, performing addition processing by the signal output addition processing unit 306 might further reduce the difference from the signal output of the pixel attributed to the reflected light from the sheet P in some cases.

The output of the pixel due to the reflected light from the background region B would cause noise for the output of the pixel attributed to the reflected light of the sheet P. Therefore, a large amount of reflected light from the background region B would deteriorate Signal-to-Noise Ratio (SNR) of the output signal of the pixel attributed to the reflected light of the sheet P. This might result in a failure in reading the edge position of the sheet P correctly.

Figure 12:
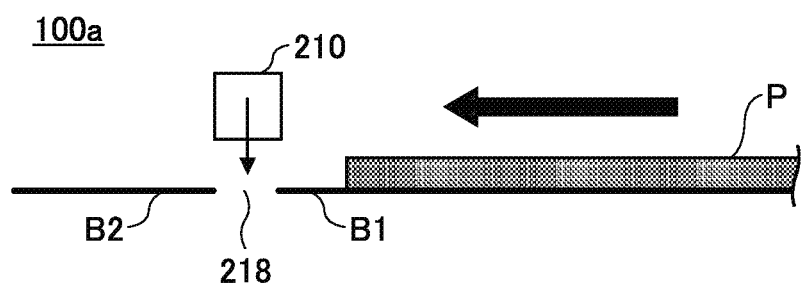
FIG. 12 is a view illustrating a state of edge position reading by an edge position reading device according to a second embodiment.

As illustrated in FIG. 12, the edge position reading device 100a of the present embodiment includes an opening 218 that allows light to pass or to be transmitted to a location facing the sensor device 210 in a region where the sensor device 210 reads the edge of the sheet P. The opening 218 is a gap formed between two conveyance belts in the case of delivering the sheet P from one conveyance belt B1 to a next conveyance belt 32 in FIG. 12, for example. Since there is no belt surface in this region, even when the sensor device 210 emits light, the light would not be reflected by the belt surface, and the reflected light would not enter the sensor device 210 either.

This makes it possible to prevent occurrence of reflected light from the background region B, ensuring the SNR of the output signal of the pixel attributed to the reflected light of the sheet P. With this configuration, it is possible to ensure the reading accuracy of the edge position of the sheet P, achieving correct reading of the edge position of the sheet P.

The effects other than those described above are similar to those described in the first embodiment.

Third Embodiment

Next, an example of the edge position reading device according to a third embodiment will be described with reference to FIGS. 13A and 13B. In the third embodiment, the description of the same configuration as in the previously described embodiment may be omitted.

Figure 13A:
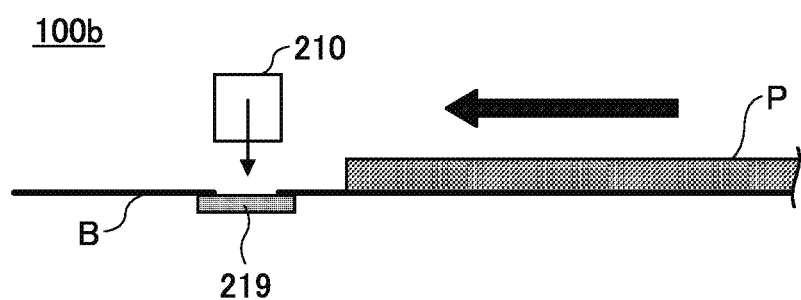
FIGS. 13A and 13B are views illustrating a state of edge position reading by an edge position reading device according to a third embodiment.
Figure 13B:
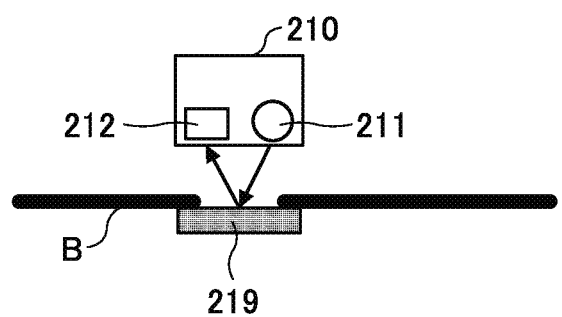

FIGS. 13A and 13B are views illustrating a state of edge position reading by an edge position reading device 100b according to the third embodiment. FIG. 13A is a schematic view of a state where the sensor device 210 reads an edge position of the sheet P being conveyed in the direction indicated by the thick black arrow, as observed from the side. FIG. 13B is an enlarged view of a periphery of the sensor device 210.

As described in the second embodiment, providing the opening 218 at a location facing the sensor device 210 in the region where the sensor device 210 reads the edge of the sheet P would allow passage of the light emitted from the sensor device 210, leading to suppression of the reflected light. However, in a case where the sheet P conveyance space is narrow, some member may be disposed in the vicinity of the opening 218 in some cases.

At this time, the light having passed through the opening 218 might be reflected by a member disposed in the vicinity of the opening 218 and might be incident on the sensor device 210 in some cases. The reflected light from the member might deteriorate the SNR of the output signal of the pixel due to the reflected light of the sheet P, similarly to the case of the second embodiment.

As illustrated in FIGS. 13A and 13B, the edge position reading device 100b of the third embodiment includes a light absorbing member 219 at a location facing the sensor device 210 in a region where the sensor device 210 reads the edge of the sheet P. The light absorbing member 219 is, for example, a black raised sheet. The light is absorbed by the sheet and thus, reflection on the surface is prevented.

The light emitted from the light source device 211 in the sensor device 210 is absorbed by the light absorbing member 219, leading to prevention of noise light incident on the sensor device 210. This makes it possible to prevent occurrence of reflected light from the background region B, ensuring the SNR of the output signal of the pixel attributed to the reflected light of the sheet P. With this configuration, it is possible to ensure the reading accuracy of the edge position of the sheet P, achieving correct reading of the edge position of the sheet P.

The effects other than those described above are similar to those described in the first embodiment.

Fourth Embodiment

Next, an example of the edge position reading device according to a fourth embodiment will be described with reference to FIGS. 14A and 14B. In the fourth embodiment, the description of the same configuration as in the previously described embodiment may be omitted.

Figure 14A:
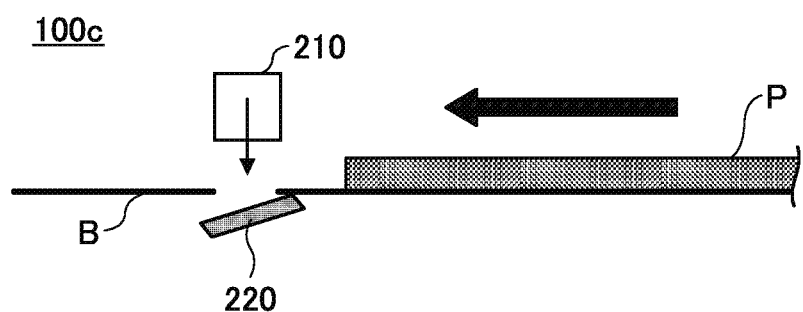
FIGS. 14A and 14B are views illustrating a state of edge position reading by an edge position reading device according to a fourth embodiment.
Figure 14B:
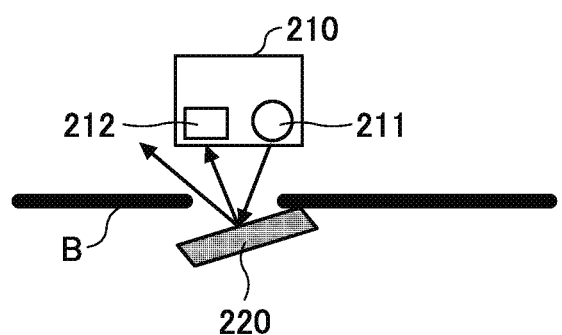

FIGS. 14A and 14B are views illustrating a state of edge position reading by an edge position reading device 100c according to the fourth embodiment. FIG. 14A is a schematic view of a state where the sensor device 210 reads an edge position of the sheet P being conveyed in the direction indicated by the thick black arrow, as observed from the side. FIG. 14B is an enlarged view of a periphery of the sensor device 210.

As described in the second embodiment, providing the opening 218 at a location facing the sensor device 210 in the region where the sensor device 210 reads the edge of the sheet P would allow passage of the light emitted from the sensor device 210, leading to suppression of the reflected light. However, in a case where the sheet P conveyance space is narrow, some member may be disposed in the vicinity of the opening 218 in some cases.

At this time, the light having passed through the opening 218 might be reflected by a member disposed in the vicinity of the opening 218 and be incident on the sensor device 210. The reflected light from the member might lead to deterioration of the SNR of the output signal of the pixel attributed to the reflected light of the sheet P, similarly to the case of the second embodiment.

As illustrated in FIGS. 14A and 14B, the edge position reading device 100c according to the fourth embodiment includes a mirror 220 at a location facing the sensor device 210 in a region where the sensor device 210 reads the edge of the sheet P. The reflection surface of the mirror 220 is inclined at a predetermined angle with respect to the light emission direction from the sensor device 210 to prevent incidence of the reflected light on the sensor device 210. The mirror 220 is an example of a light reflecting surface.

The light emitted from the light source device 211 in the sensor device 210 is reflected by the mirror 220 in a direction different from the direction in which the sensor device 210 is disposed. This makes it possible to prevent incidence of noise light onto the sensor device 210. The angle that can suppress incidence of the reflected light of the mirror 220 on the sensor device 210 is preliminarily determined by experiment or simulation, and the mirror 220 is adjusted to this angle and secured.

With the above configuration, it is possible to suppress reflected light from the background region B, making it possible to ensure the SNR of the output signal of the pixel attributed to the reflected light of the sheet P. With this configuration, it is possible to ensure the reading accuracy of the edge position of the sheet P, achieving correct reading of the edge position of the sheet P.

The effects other than those described above are similar to those described in the first embodiment.

Fifth Embodiment

Next, an example of an edge position reading device according to a fifth embodiment will be described with reference to FIGS. 15A to 18B. In the fifth embodiment, the description of the same configuration as in the previously described embodiment may be omitted.

For example, the sheet is pinched and held by a plurality of rollers, and is placed and conveyed on the conveyance belt. At this time, the sheet might be mounted with inclination on a conveyance belt due to the difference of the rotation speed of each of the plurality of rollers, or the like.

Figure 15A:
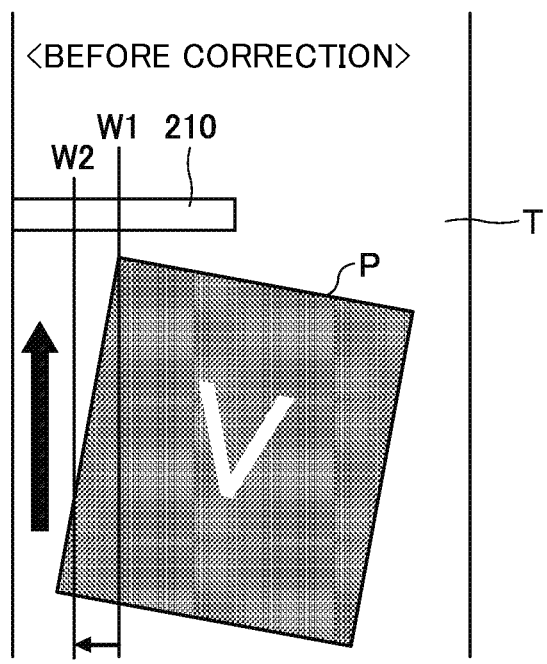
FIGS. 15A and 15B are views illustrating inclination of a sheet to be conveyed.
Figure 15B:
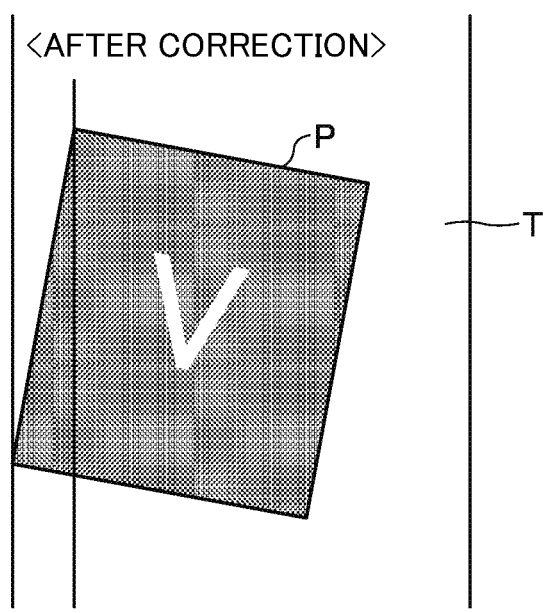

FIGS. 15A and 15B illustrate states where the sheet P is placed on the conveyance belt and conveyed with misalignment occurring in the sheet P, specifically, the sheet P is shifted in parallel in the width direction and is inclined. FIG. 15A is a state before the misalignment of the sheet P is corrected. FIG. 15B illustrates a state after the edge position reading device has read the edge position of the sheet P and the correction device of the post process has corrected the misalignment of the sheet P. As compared with the state of before the correction, the position of the edge of the sheet P is corrected after the correction. However, the inclination of the sheet P remains.

In an edge position reading device 100d of the present embodiment, a sensor device 210d reads the edge positions of a plurality of different positions of the sheet P in the conveyance direction, and detects the inclination of the sheet P on the basis of the result.

Figure 16A:
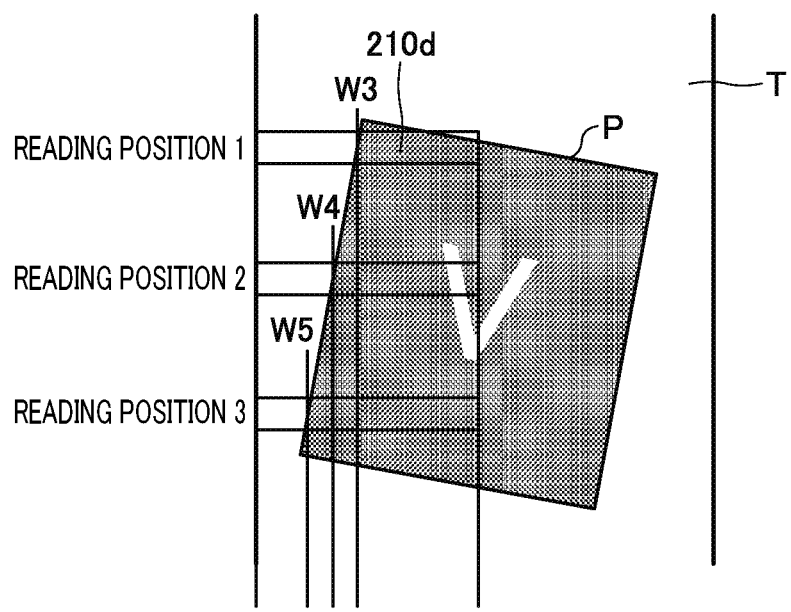
FIGS. 16A to 16D are views illustrating data read by an edge position reading device according to a fifth embodiment.

FIGS. 16A to 16D illustrate an example of a state where the sensor device 210d reads the edge positions of a plurality of different locations of the sheet P, and "sum of output values of the pixels" corresponding to the red, green, and blue light, obtained in each of locations. FIG. 16A illustrates a positional relationship of each of reading position 1, reading position 2, and reading position 3 with respect to the sheet P. Although the position in the conveyance direction of the sensor device 210d is illustrated to be shifted from the sheet P to facilitate viewing, the sensor device 210d is secured and the sheet P is conveyed, in actual reading. The timing of reading by the sensor device 210d is varied, and the edge positions of a plurality of different positions of the sheet P, that is, the reading positions 1 to 3 are read.

Figure 16B:
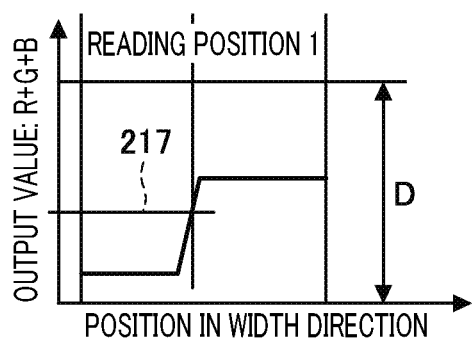
Figure 16C:
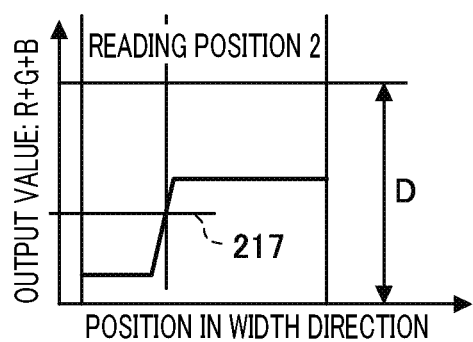
Figure 16D:
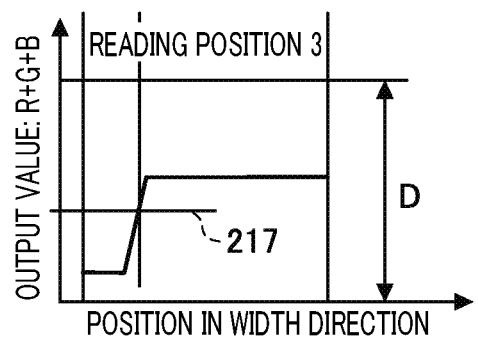

FIG. 16B illustrates a "sum of output values of the pixels" at reading position 1. That is, the value represents a sum of output values of the pixels of the pixel array 212r, the pixel array 212g, and the pixel array 212b at each of position in the width direction. Similarly, FIGS. 16C and 16D illustrate "sum of the output values of the pixels" at reading positions 2 and 3.

At reading position 1, the edge position in the width direction of the sheet P is W3. At reading positions 2 and 3, the edge positions in the width direction of the sheet P are W4 and W5, respectively. Since the sheet P is inclined, the edge positions at the respective points have different values.

Figure 17:
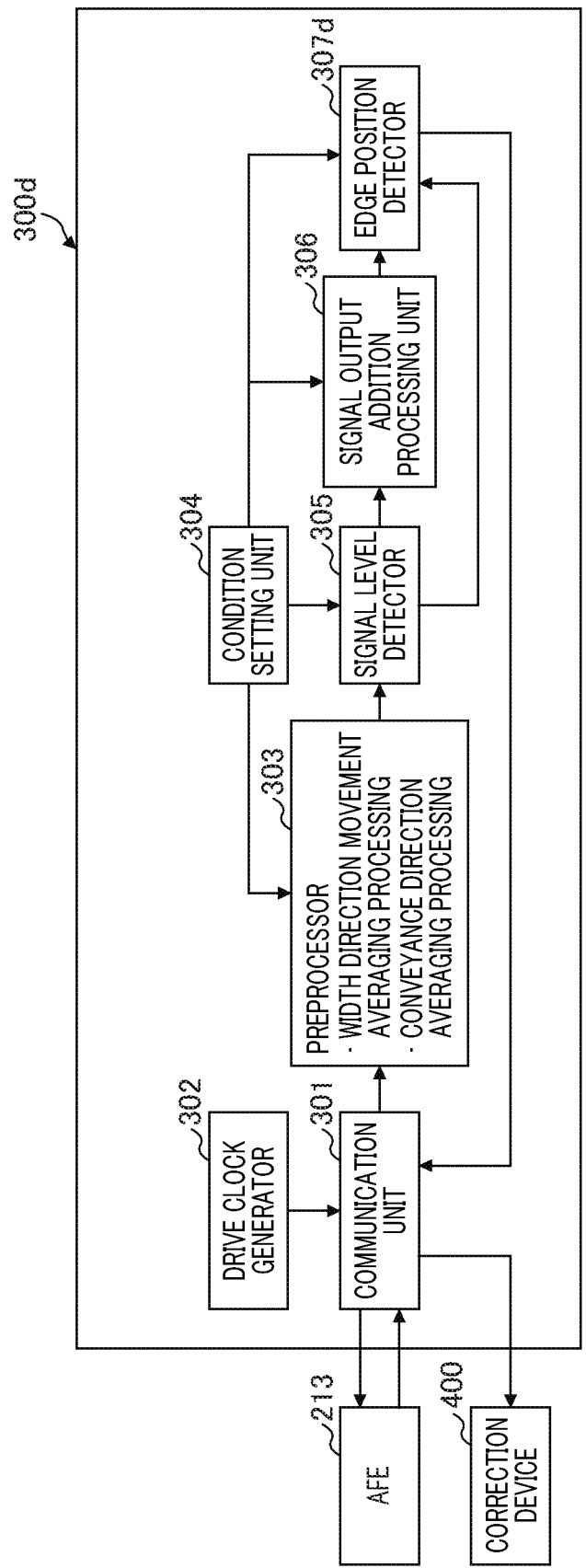
FIG. 17 is a block diagram illustrating a functional configuration of a control device in the edge position reading device according to the fifth embodiment.

FIG. 17 illustrates an example of a functional configuration of a control device 300d of the edge position reading device 100d of the present embodiment. An edge position detector 307d detects edge positions W3 to W5 by a method similar to that described in the first embodiment. In addition to this, inclination of the sheet P is calculated from the edge positions W3 to W5, for example, by calculating tan−1 {(W5−W3)/L31}. Here, L31 is a distance in the conveyance direction from reading position 1 to reading position 3. While the above description is an example in which three edge positions are read, it is sufficient to read at least two edge positions in order to obtain the inclination of the sheet P. The more the number of reading positions, the higher the accuracy of detection of inclination by the effect of averaging.

Figure 18A:
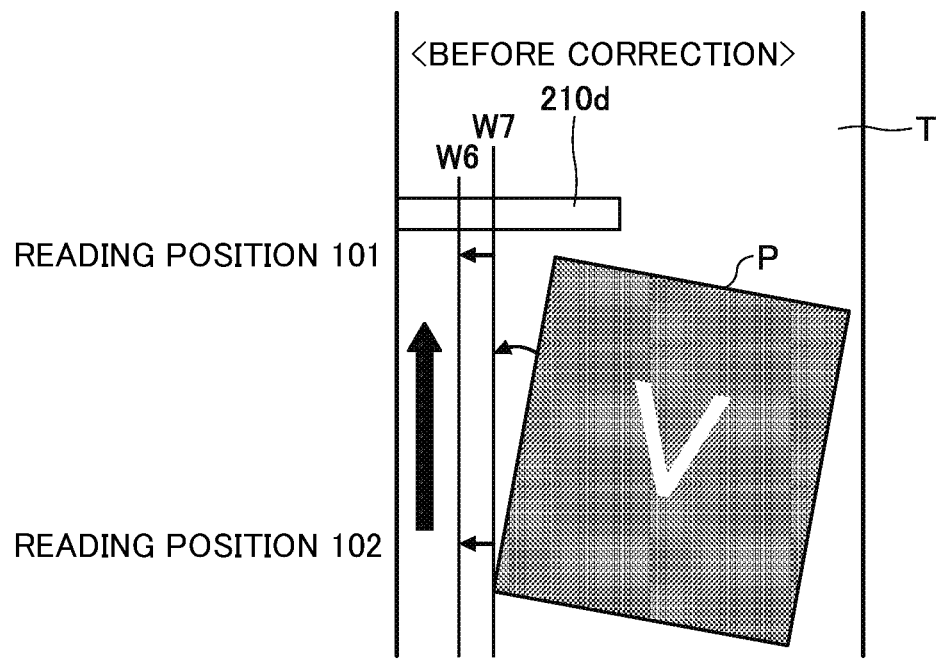
FIGS. 18A and 18B are views illustrating correction of position and inclination of a sheet based on an output of the edge position reading device according to the fifth embodiment.
Figure 18B:
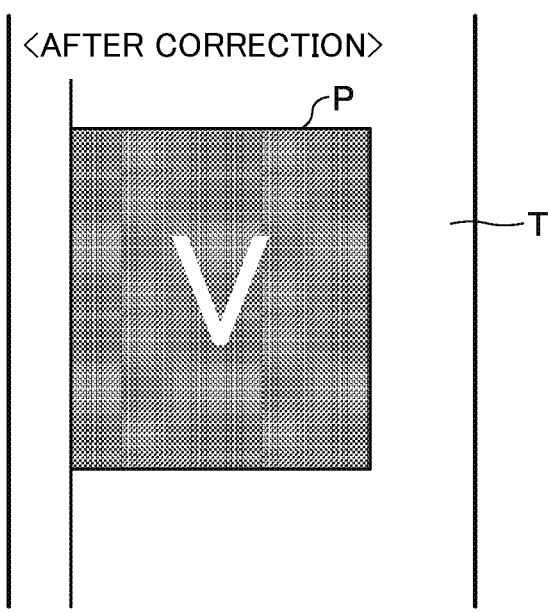

FIGS. 18A and 18B illustrate another example of a state where the sensor device 210d reads the edge positions of a plurality of different positions of the sheet P in the edge position reading device 100d according to the present embodiment. FIGS. 18A and 18B illustrate a state where inclination of the sheet P is corrected on the basis of edge positions W7 and W6 read at reading positions 1 and 2, respectively. FIG. 18A illustrates a state before correction, and 18B illustrates a state after the correction.

In the edge position reading device 100d, the sensor device 210d reads W7 and W6, and the edge position detector 307d calculates inclination tan−1 {(W7−W6)/L76}. Here, L76 is a distance in the conveyance direction from reading position 1 to reading position 2. The calculated inclination of the sheet P is output to the correction device and corrected by the correction device.

In the edge position reading device 100d, it is also allowable to preliminarily define an ideal position in the width direction of the sheet P and then to calculate misalignment of the sheet P with respect to the ideal position from the difference with the edge position detected by the edge position detector 307d. For example, in FIGS. 18A and 18B, in a case where W6 is defined an ideal position, the edge position detector 307d can calculate misalignment of the sheet P by the calculation of W7−W6. The calculated misalignment of the sheet P is output to the correction device and corrected by the correction device.

As described above, according to the edge position reading device 100d of the present embodiment, the position and the inclination of the sheet can be detected on the basis of the read edge position of the sheet P.

The effects other than those described above are similar to those described in the first embodiment.

Sixth Embodiment

Next, an example of an edge position reading device of a sixth embodiment will be described with reference to FIGS. 19 to 21. In the sixth embodiment, the description of the same configuration as in the previously described embodiment may be omitted.

As described above, the edge position reading device has a possibility of erroneously detecting the edge position in a case where the output value of the pixel exceeds the threshold due to dirt and similar substance. The present embodiment is to prevent such erroneous detection of dirt and similar substance due to the output value of the pixel.

Figure 19:
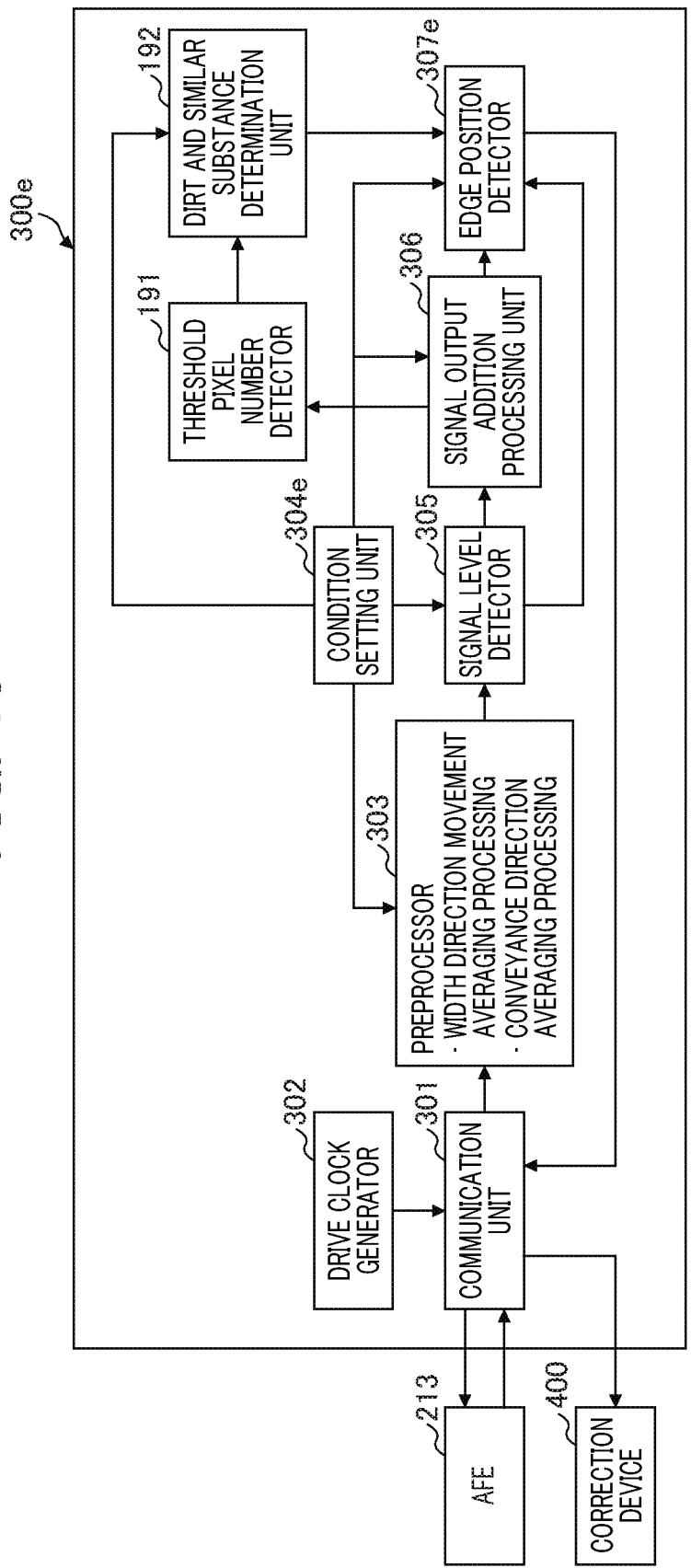
FIG. 19 is a block diagram illustrating a functional configuration of a control device in an edge position reading device according to a sixth embodiment.

FIG. 19 is a block diagram illustrating an example of a functional configuration of a control device 300e of an edge position reading device 100e of the present embodiment. The control device 300e includes a threshold pixel number detector 191 and a dirt and similar substance determination unit 192.

The threshold pixel number detector 191 detects the number of pixels in a case where the output value of the pixel exceeds the threshold of the output value in a predetermined range in the width direction. The detected number of pixels is input to the dirt and similar substance determination unit 192. In a case where the detected number of pixels falls below the threshold of the number of pixels in the predetermined range preset by the condition setting unit 304e, the dirt and similar substance determination unit 192 determines that the output value of this pixel is caused by dirt and similar substance, and then, outputs the determination result to the edge position detector 307e. The edge position detector 307e is configured to disregard the output value of the pixel determined to be caused by dirt and similar substance in the edge detection. The condition setting unit 304e can flexibly change the predetermined range and the threshold of the number of pixels. The threshold pixel number detector 191 is an example of a pixel number detector. The edge position detector 307e is an example of "an edge position detector that detects an edge position of a target object on the basis of an output of the adder and an output of the pixel number detector".

Figure 20:
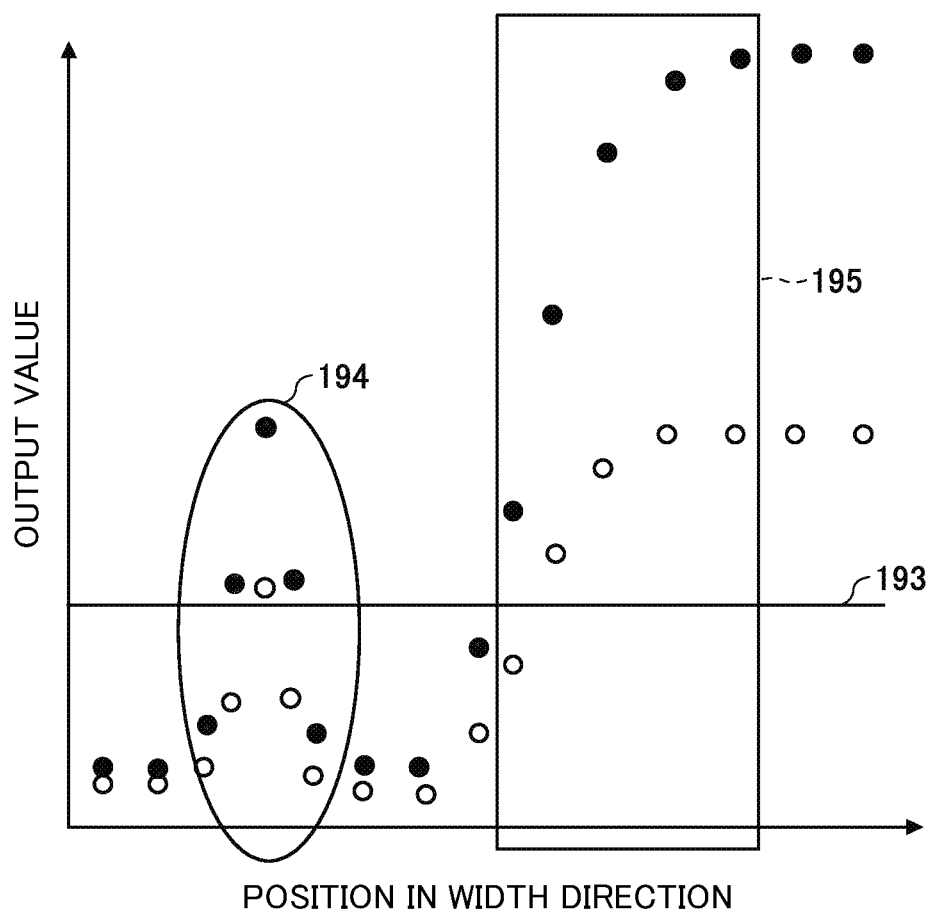
FIG. 20 is a chart illustrating a first example of data read by the edge position reading device according to the sixth embodiment.

FIG. 20 illustrates an example of data read by the edge position reading device 100e according to the present embodiment. The horizontal axis represents the position in the width direction, and the vertical axis represents the output value of the pixel. The plotted black circle illustrates the sum of the pixel output values for light of red, green, and blue, while the plotted white circle illustrates the pixel output value for red light, for example, without such addition. A solid line 193 indicates a threshold for the output value of the pixel. A solid circled dirt and similar substance output 194 indicates an output value of the pixel caused by the dirt and similar substance, while sheet output 195 surrounded by the dashed square indicates a pixel output value caused by the sheet P.

For example, the number of pixels, among the dirt and similar substance output 194, exceeding the threshold 193 is one out of red light pixel output, that is, five plotted white circles. In contrast, the number of pixels exceeding the threshold 193 is four out of five white circle plots in the sheet output 195. Accordingly, setting the predetermined range to five pixels and setting the threshold of the number of pixels in the dirt and similar substance determination unit 192 to two pixels or more would make it possible to correctly read the edge position without being influenced by the output caused by dirt and similar substance.

Meanwhile, the number of pixels exceeding the threshold 193 in the dirt and similar substance output 194 is three out of the pixel outputs for red, green, and blue light, that is, five plotted black circles. In contrast, the number of pixels exceeding the threshold 193 is five out of five white circle plots in the sheet output 195. Accordingly, in this case, setting the predetermined range to five pixels and setting the threshold of the number of pixels in the dirt and similar substance determination unit 192 to four pixels or more would make it possible to correctly read the edge position without being influenced by the output caused by dirt and similar substance.

Figure 21:
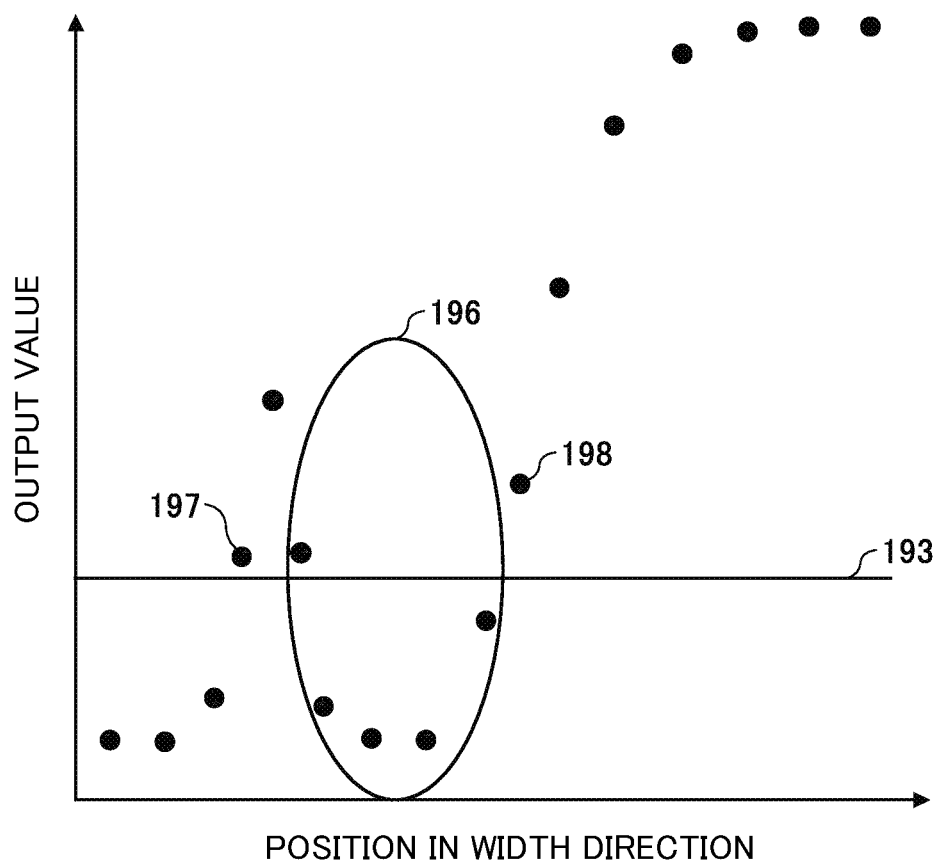
FIG. 21 is a chart illustrating a second example of data read by the edge position reading device according to the sixth embodiment.

FIG. 21 illustrates another example of data read by the edge position reading device 100e according to the present embodiment. FIG. 21 illustrates a side effect in a case where a threshold of the number of pixels is set to an excessively great value.

In FIG. 21, the plotted black circles indicate the sum of the pixel output values for red, green, and blue light, while the black dirt and similar substance output 196 surrounded by the solid circle indicates an output value of the pixel due to black dirt and similar substance. A plot 197 indicates the correct edge position, while a plot 198 indicates an erroneously detected edge position. The output value of the pixel is low in 196 because the dirt and similar substance is black.

In such a case, for example, setting the predetermined range to five pixels and setting the threshold of the number of pixels to three pixels or more would make it possible to detect the plot 197 representing the correct edge position. However, setting the predetermined range to five pixels and setting the threshold of the number of pixels to five pixels or more would result in detection of the plot 198 representing an incorrect edge position. Accordingly, in a case where the size of dirt and similar substance is predicted to be small, or in a case where addition of the pixel output to the red, green, and blue light is not to be performed, it is desirable to set the threshold of the number of pixels to a small value.

As described above, according to the present embodiment, it is possible to correctly read the edge position without being influenced by the output caused by dirt and similar substance, and it is possible to optimize the predetermined range, the threshold of the number of pixels in cases where addition processing of pixel outputs are performed and not performed.

Seventh Embodiment

In a seventh embodiment, the description of the same configuration as in the previously described embodiment may be omitted.

As described in the description of FIG. 5, the threshold for edge detection may be configured to be determined automatically. In that case, for example, the signal level Vh and the signal level Vl are to be used out of the output values of the pixels in the width direction obtained by the sensor device 210, and (Vh+Vl)/2 is to be set as the threshold. However, the sheet P includes a transparent sheet or metallic sheet in which output values of pixels are not stable due to light reflected by the sheet.

Figure 22:
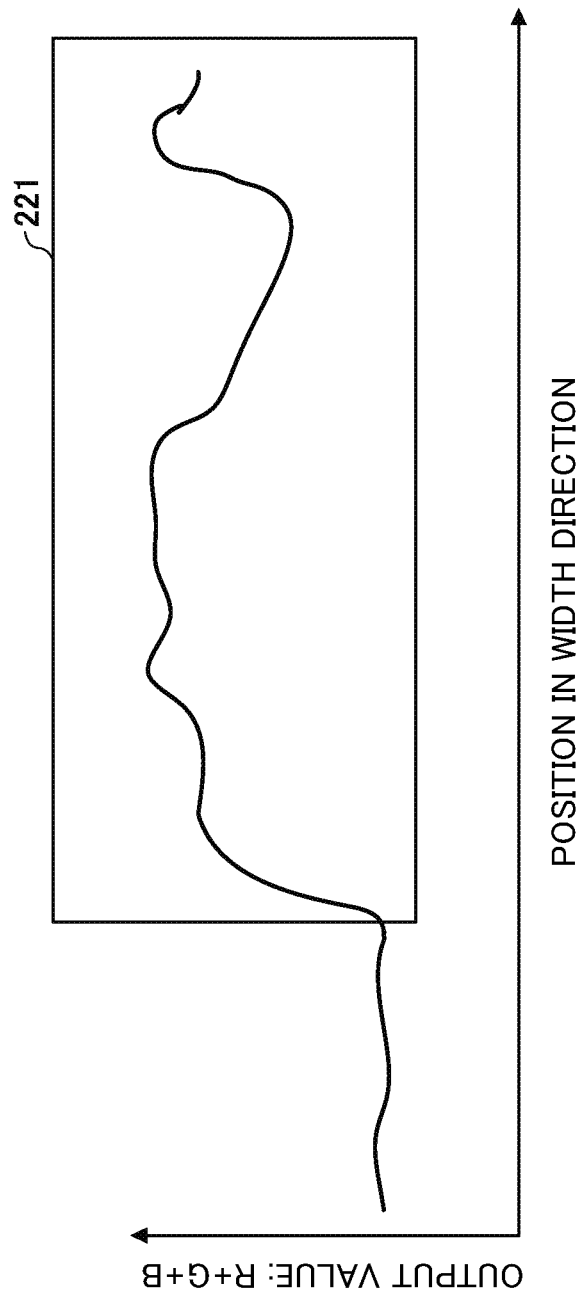
FIG. 22 is a view illustrating an example of instability of an output value of a pixel due to sheet type.

FIG. 22 illustrates an example of this case. In FIG. 22, a portion 221 indicated by a solid square represents an output value of a pixel by light reflected by the metallic sheet. In this case, as illustrated in the figure, where the output value greatly changes, obtaining the threshold automatically using the signal levels Vh and Vl might lead to failure in reading the edge position correctly.

To overcome this, an edge position reading device 100f according to the present embodiment detects the sheet type and switches the method of determining the threshold in accordance with the sheet type.

FIG. 23 is a block diagram illustrating an example of a functional configuration of a control device 300f of the edge position reading device 100f of the present embodiment. The control device 300f includes a sheet type detector 222.

The sheet type detector 222 detects the type of sheet to be conveyed. For example, sheet type detection is implemented by referring to the sheet type selected in the operation panel 23 or the like and stored in the RAM in the image forming apparatus. The sheet type detector 222 detects that the sheet is a transparent sheet or metallic sheet in which an output value of a pixel attributed to the reflected light is not stable, and outputs the detection result to the condition setting unit 304f. In this case, the condition setting unit 304f would not automatically determine a threshold of the output value of the pixel for edge detection, and sets the threshold to a fixed value. In contrast, the sheet type detector 222 detects that the sheet is a sheet in which an output value of a pixel attributed to reflected light is stable, and outputs the detection result to the condition setting unit 304f. In this case, the condition setting unit 304f sets the threshold of the output value of the pixel for edge detection to be automatically determined. The condition setting unit 304f is an example of a threshold determination method alteration unit, and the sheet type detector 222 is an example of a type detector.

As described above, by switching the setting of the determination method of the threshold in accordance with the sheet type, it is possible to suppress the influence of the sheet type, leading to correct reading of the edge position.

Eighth Embodiment

As described in the description of FIG. 5, the present embodiment relates to the width direction moving averaging processing in the preprocessor 303. In an eighth embodiment, the description of the same configuration as in the previously described embodiment may be omitted.

Figure 24:
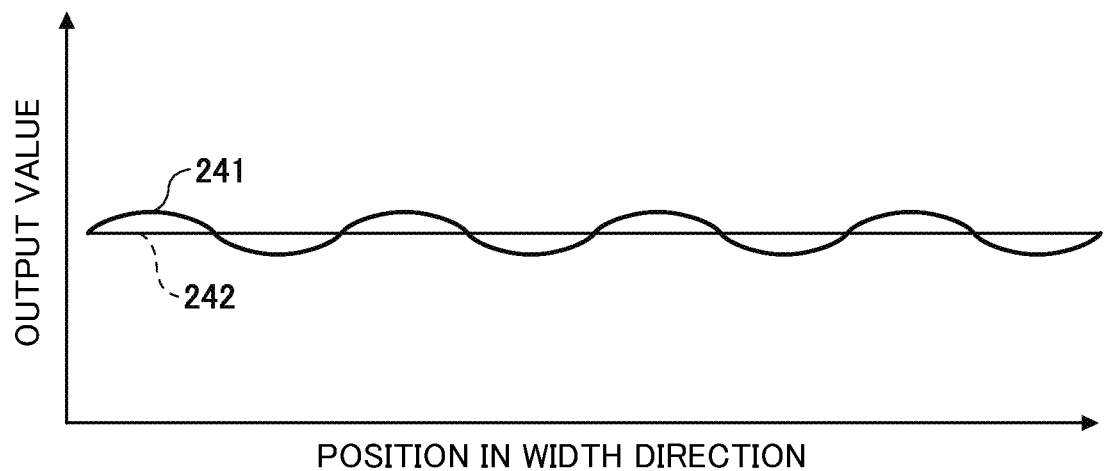
FIG. 24 is a view illustrating an example of an effect of width direction moving averaging processing.

In the edge position reading device, in a case where a rod lens is used, periodical output noise might be generated due to crosstalk or the like of light beams passing through the rod lens. FIG. 24 illustrates an example of such periodic output noise and an output value after width direction moving averaging processing in the preprocessor 303. In FIG. 24, a solid line 241 is an output value before the width direction moving averaging processing, while a broken line 242 is an output value after the width direction moving averaging processing. While variations in output value having periodicity are observed before the processing, variations are suppressed after the processing.

Figure 25:
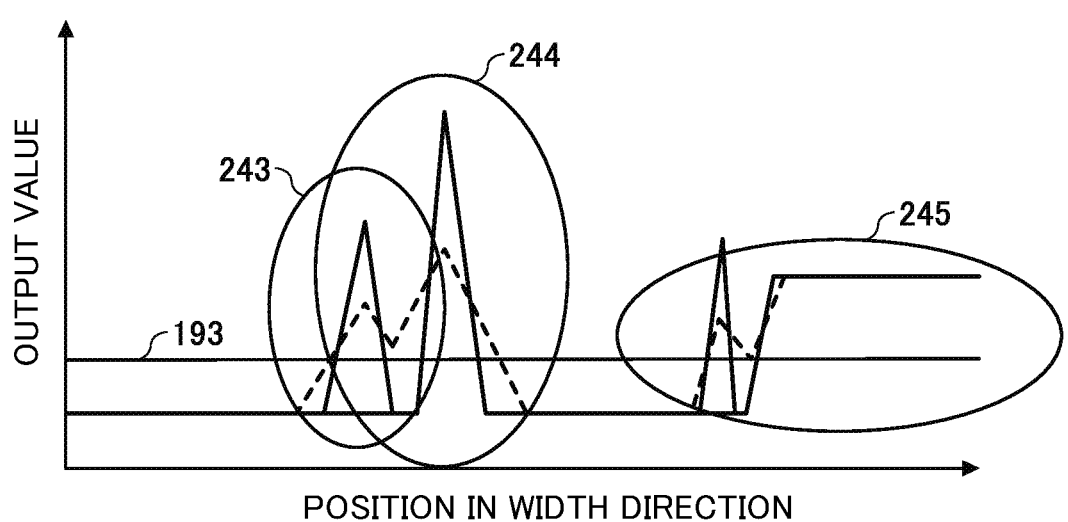
FIG. 25 is a view illustrating an example of a side effect of the width direction moving averaging processing.

Meanwhile, FIG. 25 illustrates an example of a side effect in a case where the width direction moving averaging processing is performed. In FIG. 25, dirt 243 in the circled portion represents an output of a pixel attributed to one piece of dirt, dirt 244 in the circled portion represents an Output of a pixel attributed to another piece of dirt, and a circled portion 245 represents an output of the pixel attributed to the edge of the sheet P. The plotted solid line represents an output in a case where the width direction moving averaging processing has not been performed, while the plotted broken line is an output in a case where the width direction moving averaging processing has been performed.

As illustrated in FIG. 25, in a case where the width direction moving averaging processing is not to be performed, the number of pixels exceeding the threshold of the output value of the pixel is small in the dirt 243 and dirt 244. Accordingly, these are determined as dirt by the above described dirt and other contaminants determination processing. However, performing the width direction moving averaging processing in the width direction would form a combined mass of the dirt 243 and the dirt 244, leading to an increase in the number of pixels exceeding the threshold of the output value of the pixels. As a result, the dirt 243 and the dirt 244 would not be determined as dirt, leading to erroneous detection of the edge position.

In a case where there is an output of dirt and similar substance in the vicinity of the edge of the sheet P, the two pieces of dirt can be separated when the width direction moving averaging processing is not performed, whereas performing the width direction moving average processing would lead to detection of the edge position after generation of combined mass of the pieces of dirt. This would result in erroneous detection of the edge position.

In particular, performing addition processing of the output of the pixel to the red, green, and blue light might increase the output due to dirt and similar substance, leading to a possibility of generation of a side effect of the above-described width direction moving averaging processing.

Therefore, in an edge position reading device 100a according to the present embodiment, execution of the width direction moving averaging processing is to be switched between the case where the addition processing of the output of the pixel for the red, green, and blue light is performed and the case where it is not performed.

Figure 26:
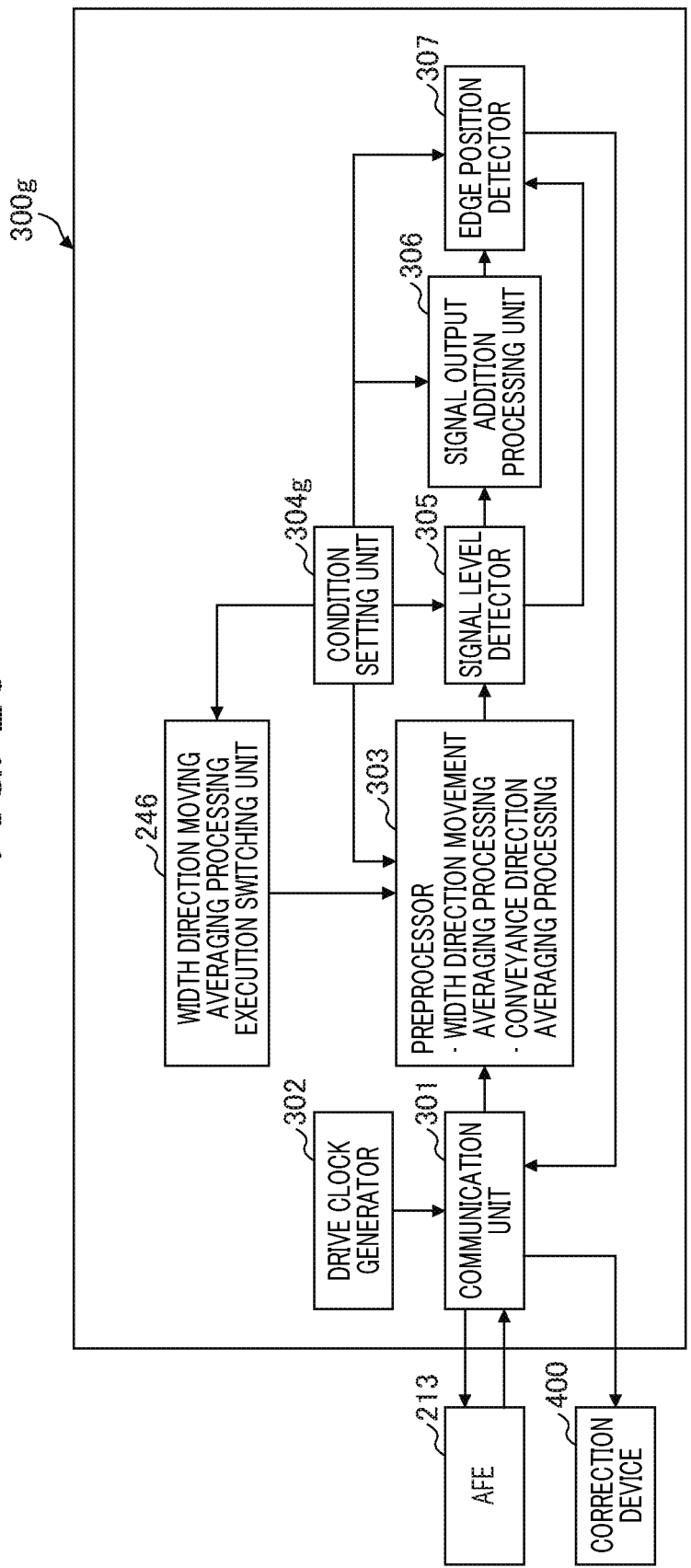
FIG. 26 is a block diagram illustrating a functional configuration of a control device in an edge position reading device according to an eighth embodiment.

FIG. 26 is a block diagram illustrating an example of a functional configuration of a control device 300g of the edge position reading device 100g according to the present embodiment. The control device 300g includes a width direction moving averaging processing execution switching unit 246. With reference to the condition setting unit 304g, the width direction moving averaging processing execution switching unit 246 sets the preprocessor 303 such that the width direction moving average processing is not to be executed in a case where addition processing of pixel output for red, green, and blue light is to be performed. The width direction moving averaging processing execution switching unit 246 sets the preprocessor 303 such that the width direction moving average processing is to be executed in a case where addition processing is not to be performed. With this setting, it is possible to suppress the output noise by the width direction moving averaging processing while preventing side effects. The preprocessor 303 is an example of a moving averaging processing execution unit.

Next, an example of an edge position reading device according to a ninth embodiment will be described with reference to FIGS. 27 and 28. In the ninth embodiment, the description of the same configuration as in the previously described embodiment may be omitted.

The edge position reading device has a possibility of erroneously detecting the edge position in a case where the output value of the pixel exceeds the threshold due to foreign objects such as dirt. In the present embodiment, such erroneous detection of the edge position based on the output value of the pixel of the foreign object such as dirt is prevented, and accurate edge position detection is enabled.

Figure 27:
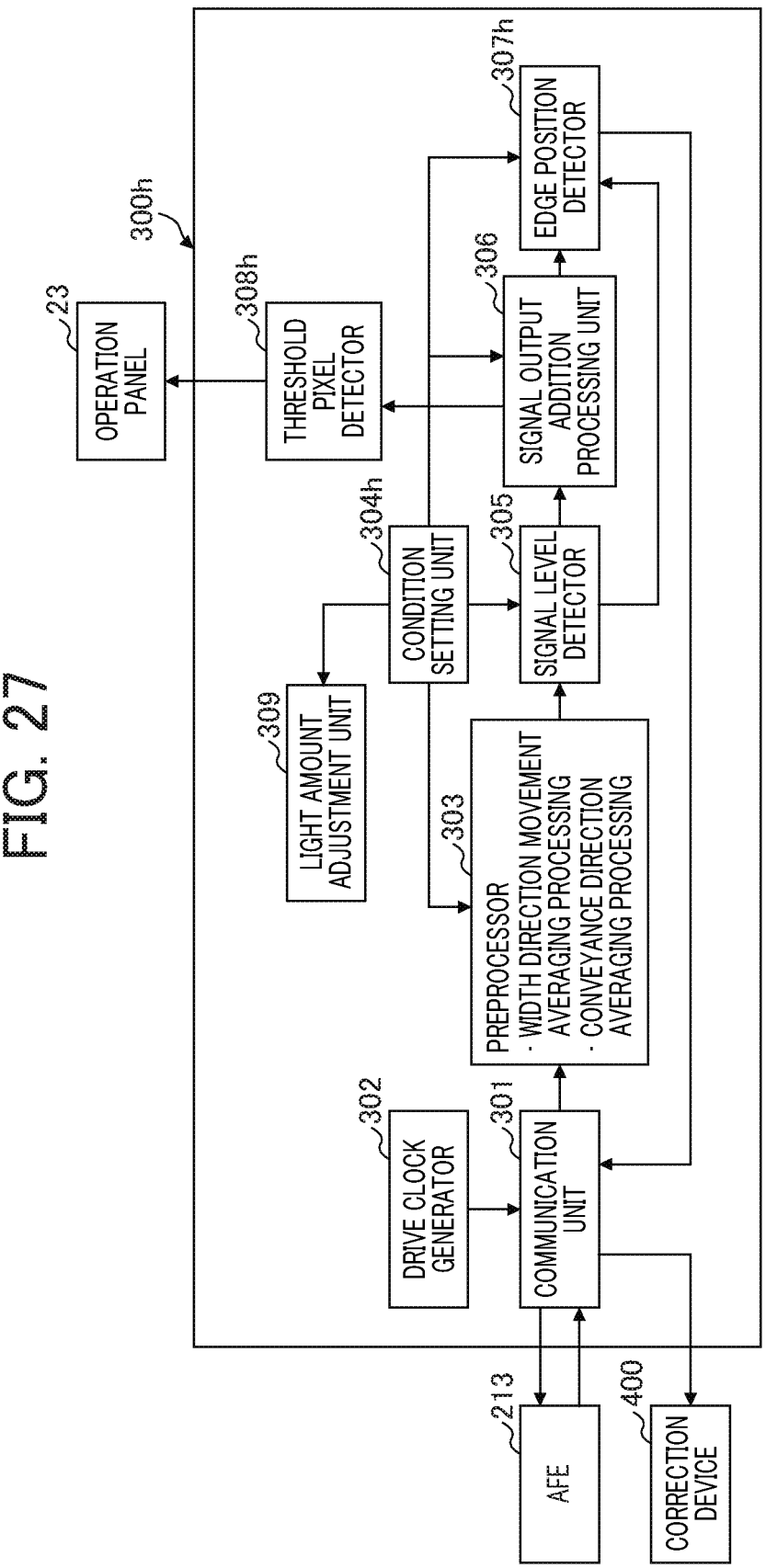
FIG. 27 is a block diagram illustrating a functional configuration of a control device in an edge position reading device according to a ninth embodiment.

FIG. 27 is a block diagram illustrating an example of a functional configuration of a control device 300h of an edge position reading device 100h according to the present embodiment. The control device 300h includes a threshold pixel detector 308h and a light amount adjustment unit 310. In the present embodiment, a condition setting unit 304h sets conditions for detecting foreign objects such as dirt. Similarly to the condition setting unit 304 of each of the embodiments described above, it is also possible to set conditions for reading the edge position. Furthermore, in the present embodiment, the edge position detector 307h determines a position (coordinates) at which the output value of the adjacent pixel in the width direction changes from a value smaller than a first predetermined threshold to a value larger than the threshold, and outputs the determined position as an edge position of the sheet P.

The threshold pixel detector 308h as an example of the threshold pixel detector detects a threshold pixel which is a pixel whose output value is larger than a second predetermined threshold in a state where there is no target object in the region for reading the edge. The output value of a pixel is ideally within a predetermined range in a state where there is no sheet which is a target object of edge reading in an edge reading region. Therefore, in a case where there is a pixel having an output value larger than a predetermined threshold, it is possible to determine that the output value of this pixel is attributed to a foreign object such as dirt. Accordingly, the threshold pixel detector 308h can also be referred to as a foreign object detector. The detection result of the threshold pixel detector 308h includes, for example, the output value of the threshold pixel and the position in the width direction of the threshold pixel. The threshold pixel detector 308h may detect threshold pixels in an entire detectable range in the width direction, or may perform detection in a predetermined range.

Subsequently, the threshold pixel detector 308h instructs the display panel 23 (an example of the display unit) to display that there is a foreign object. This allows the user to know that there is a foreign object such as dirt causing an edge erroneous detection. The display on the display panel 23 may include foreign object position information or the like.

The light amount adjustment unit 310 adjusts the amount of light received by the light receiving device 212. Examples of the adjustment include, but are not limited to, alteration of the amount of current of the CIS to the LED, alteration of exposure time per line, or alteration of an amplification factor of the light reception signal.

The condition setting unit 304h according to the present embodiment sets the light amount received by the light receiving device 212 in a state where there is no target object in a region where the sensor device 210 reads the edge of the target object to be larger than the amount of light received by the light receiving device 212 in a state where there is a target object in the region where the sensor device 210 reads the edge of the target object. The condition setting unit 304h can flexibly set and change the detection range in the width direction of the threshold pixel detector 308h. The condition setting unit 304h can also flexibly change a predetermined threshold of an output value of the threshold pixel detector 308h, the predetermined threshold of the number of pixels, or the like.

The edge position detector 307h is an example of "an edge position detector that detects an edge position of a target object on the basis of an output of the adder". The edge position detector 307h detects the edge position on the basis of the output of the adder in a state where the target object is in a region where the sensor device 210 reads the edge of the target object. Note that the edge position detector 307 in each of the embodiments described above can also detect the edge position on the basis of the output of the adder in a state where the target object is in a region where the sensor device 210 reads the edge of the target object.

As described above, the light amount received by the light receiving device 212 in a state where there is no target object in a region where the sensor device 210 reads the edge of the target object is set to be larger than the amount of light received by the light receiving device 212 in a state where there is a target object in a region where the sensor device 210 reads the edge of the target object. This enables detection of foreign object such as dirt in a state where the sheet is not present under the sensor, leading to prevention of erroneous detection of an edge due to the foreign object.

Figure 28:
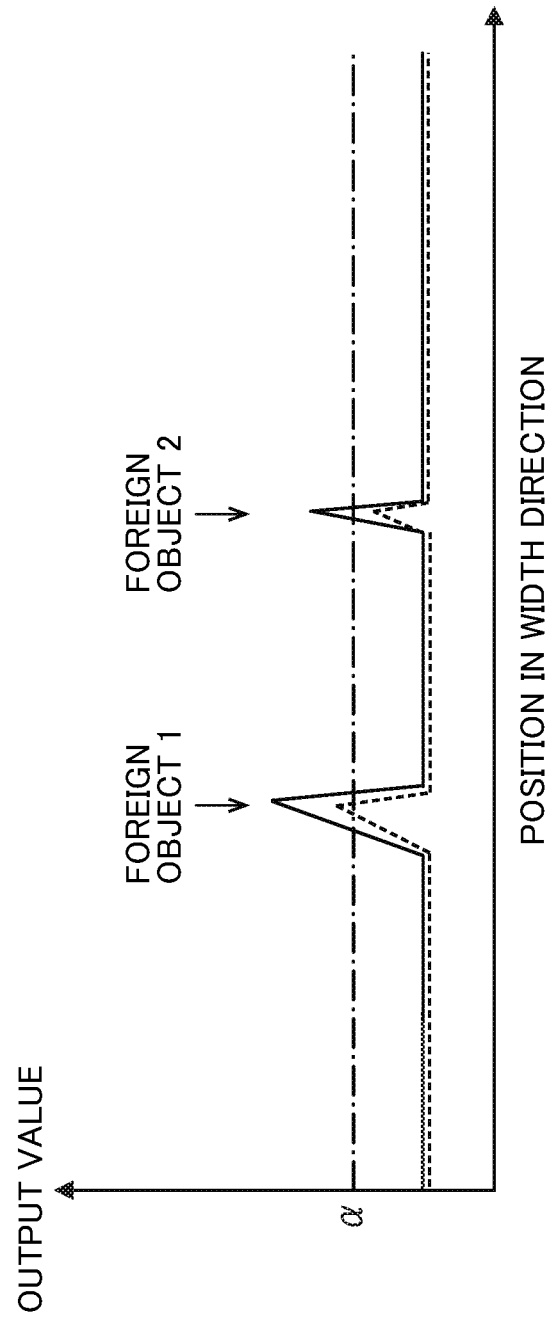
FIG. 28 is a view illustrating an amount of the reflected light at the time of edge detection processing and at the time of foreign object detection processing.

FIG. 28 is a view illustrating an amount of the reflected light at the time of edge detection processing and at the time of foreign object detection processing.

The edge detection processing is processing to be executed in a state where the target object exists in a region where the sensor device 210 reads the edge of the target object. In a case where there is a target object, it is possible, as described above, to detect the edge position of the target object in the width direction on the basis of the position at which the output in the presence of the target object changes to a value larger than the first predetermined threshold.

In contrast, the foreign object detection processing is processing to be executed in a state where there is no target object in the region where the sensor device 210 reads the edge of the target object. In the absence of the target object, the sensor device 210 ideally detects a substantially constant output value from the background region. Therefore, in a case where a threshold pixel exceeding the second predetermined threshold being the threshold at the time of detecting a foreign object is detected during the foreign object detection processing, it would be possible to detect the presence of the foreign object such as dirt at the width direction position corresponding to the threshold pixel.

FIG. 28 illustrates an output value of one line of pixels of certain light read by a pixel array of the light receiving device 212 at the time of foreign object detection processing. The horizontal axis indicates a position (coordinates) of each of pixels of the pixel array in the width direction. The vertical axis indicates an output value of the pixel.

The dotted lines in FIG. 28 are output values under the same light amount condition as the time of edge detection processing. As observed from the dotted line, an output value attributed to foreign object 1 exceeds a threshold α. In contrast, an output value attributed to foreign object 2 does not exceed the threshold α. In a case where the threshold α is a first predetermined threshold being a threshold at the time of edge detection processing, foreign object 2 is not detected, and this would not cause erroneous detection of an edge. However, in a case where the output value is close to the threshold α, there is a possibility of accidental failure of detection due to variation in reading operation. When sheet dust or the like is further accumulated in foreign object 2, the output value at the position of foreign object 2 gradually increases, and erroneous detection of the end portion of the sheet will eventually occur.

To overcome this, as illustrated by the solid line, control is performed, during the foreign object detection processing, to increase the light amount of the reflected light detected by the sensor device 210 more than the amount at the edge detection processing. In a case where both the first predetermined threshold being a predetermined value at the time of edge detection processing, and the second predetermined threshold being a predetermined value at the time of foreign object detection processing are the threshold α, control in this manner would be able to more easily detect foreign object having relatively small output value.

That is, as an example, control is performed such that the emission light in a state where the target object is not present in the region where the sensor device 210 reads the edge of the target object is larger than the emission light in a state where the target object is present in the region where sensor device 210 reads the edge of the target object, that is, at the time of edge detection. This leads to easy detection of foreign objects such as dirt with no sheet present under the sensor. Examples of a specific means to increase the light amount of the reflected light include, but are not limited to, increasing the electric current of CIS LED.

As another example, control is performed such that a detection signal corresponding to the amount of received light in a state where the target object is not present in the region where the sensor device 210 reads the edge of the target object is larger than the detection signal corresponding to the amount of received light in a state where the target object is present in the region where sensor device 210 reads the edge of the target object, that is, at the time of edge detection. This also leads to easy detection of foreign objects such as dirt with no sheet present under the sensor. Examples of specific means for increasing the detection signal include, but are not limited to, increasing the exposure time per line and increasing the amplification factor of the light reception signal.

Next, an example of an edge position reading device according to a tenth embodiment will be described with reference to FIGS. 29 and 30. In the tenth embodiment, the description of the same configuration as in the previously described embodiment may be omitted.

As described above, the edge position reading device 100 has a possibility of erroneously detecting the edge position in a case where the output value of the pixel exceeds the threshold due to foreign objects such as dirt. In the present embodiment, such erroneous detection of the edge position based on the output value of the pixel of the foreign object such as dirt is prevented, and accurate edge position detection is enabled.

Figure 29:
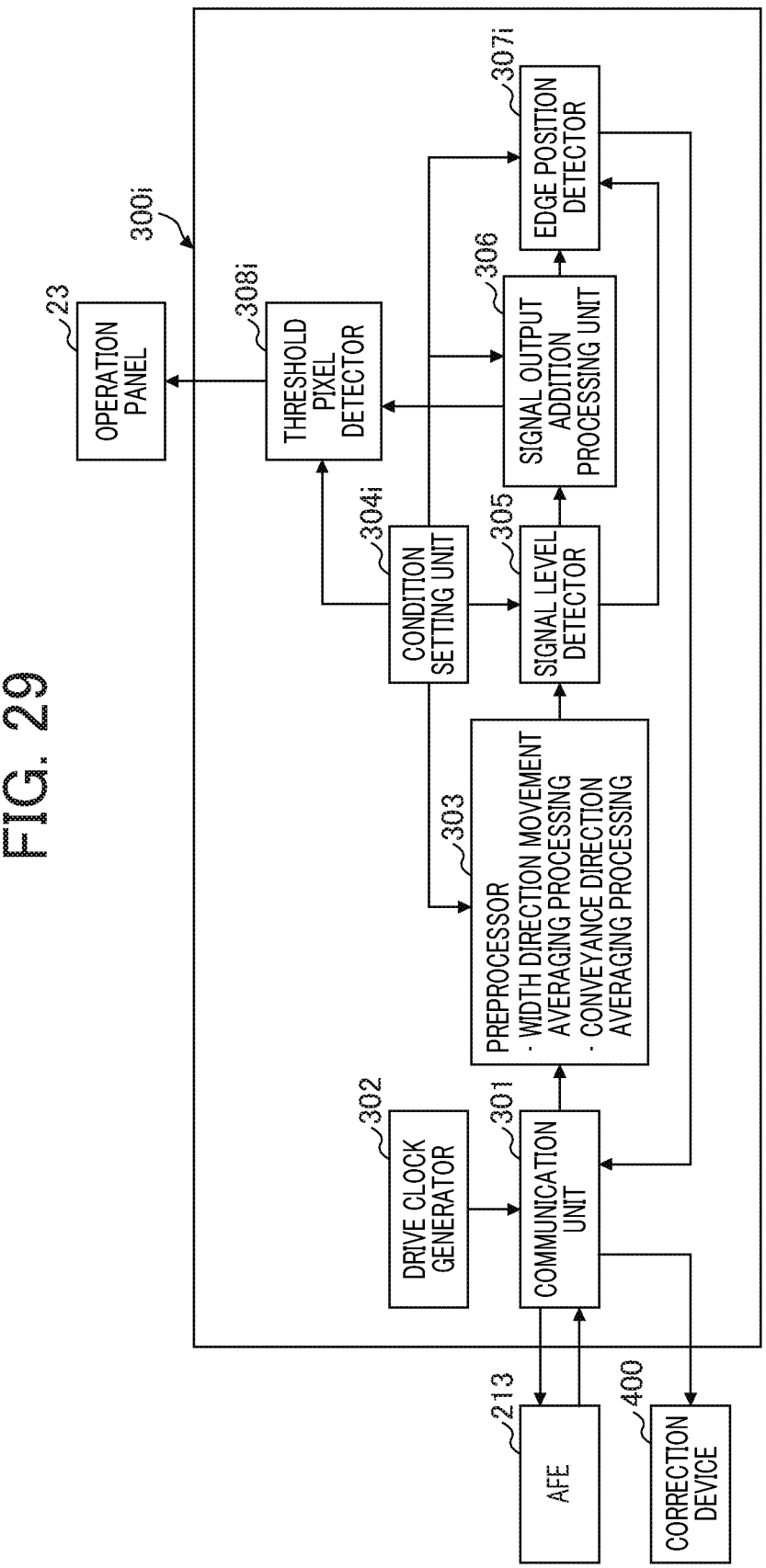
FIG. 29 is a block diagram illustrating a functional configuration of a control device in an edge position reading device according to a tenth embodiment.

FIG. 29 is a block diagram illustrating an example of a functional configuration of a control device 300*i* of the edge position reading device 100 according to the present embodiment. The control device 300*i* includes a threshold pixel detector 308*i*. In the present embodiment, the condition setting unit 304*i* performs condition setting for detecting foreign object such as dirt. The condition setting unit 304*i* can also set conditions for reading the edge position, similarly to the case of the condition setting unit 304 of each of the above-described embodiments. Furthermore, the edge position detector 307*i* determines a position (coordinates) at which the output value of the adjacent pixel in the width direction changes from a value smaller than a first predetermined threshold to a value larger than the threshold, and outputs the determined position as an edge position of the sheet P. The edge position detector 307*i* is an example of "an edge position detector that detects an edge of a target object".

The threshold pixel detector 308*i* as an example of the threshold pixel detector detects a threshold pixel which is a pixel whose output value is larger than a second predetermined threshold in a state where there is no target object in the region for reading the edge. The output value of a pixel is ideally within a predetermined range in a state where there is no sheet which is a target object of edge reading in an edge reading region. Therefore, in a case where there is a pixel having an output value larger than a predetermined threshold, it is possible to determine that the output value of this pixel is attributed to a foreign object such as dirt. Accordingly, the threshold pixel detector 308*i* can also be referred to as a foreign object detector. The detection result of the threshold pixel detector 308*i* includes, for example, the output value of the threshold pixel and the position in the width direction of the threshold pixel. The threshold pixel detector 308*i* may detect threshold pixels in an entire detectable range in the width direction, or may perform detection in a predetermined range.

The condition setting unit 304*i* according to the present embodiment sets the second predetermined threshold in a state where there is no target object in a region where the sensor device 210 reads the edge of the target object to be smaller than the first predetermined threshold in a state where there is a target object in a region where the sensor device 210 reads the edge of the target object, namely, at the time of edge detection.

Subsequently, the threshold pixel detector 308*i* instructs the display panel 23 to display that there is a foreign object. The display on the display panel 23 may include foreign object position information or the like.

The detection range of the threshold pixel detector 308*i*, the predetermined threshold of the output value, and the predetermined threshold of the number of pixels can be flexibly changed by the condition setting unit 304*i*. The edge position detector 307*h* is an example of "an edge position detector that detects an edge position of a target object on the basis of an output of the adder". The edge position detector 307*h* detects the edge position on the basis of the output of the adder in a state where the target object is in a region where the sensor device 210 reads the edge of the target object. Note that the edge position detector 307 in each of the embodiments described above can also detect the edge position on the basis of the output of the adder in a state where the target object is in a region where the sensor device 210 reads the edge of the target object.

The threshold pixel detector 308*i* subsequently instructs the display panel 23 to display that there is a foreign object. The display on the display panel 23 may include foreign object position information or the like.

As described above, the present embodiment is configured to set the second predetermined threshold in a state where there is no target object in a region where the sensor device 210 reads the edge of the target object to be smaller than the first predetermined threshold in a state where there is a target object in the region where the sensor device 210 reads the edge of the target object, namely, at the time of edge detection. Accordingly, it is possible to facilitate detection of foreign objects such as dirt in a state where the sheet is not disposed under the sensor, leading to prevention of erroneous detection of the edge due to foreign objects.

Figure 30:
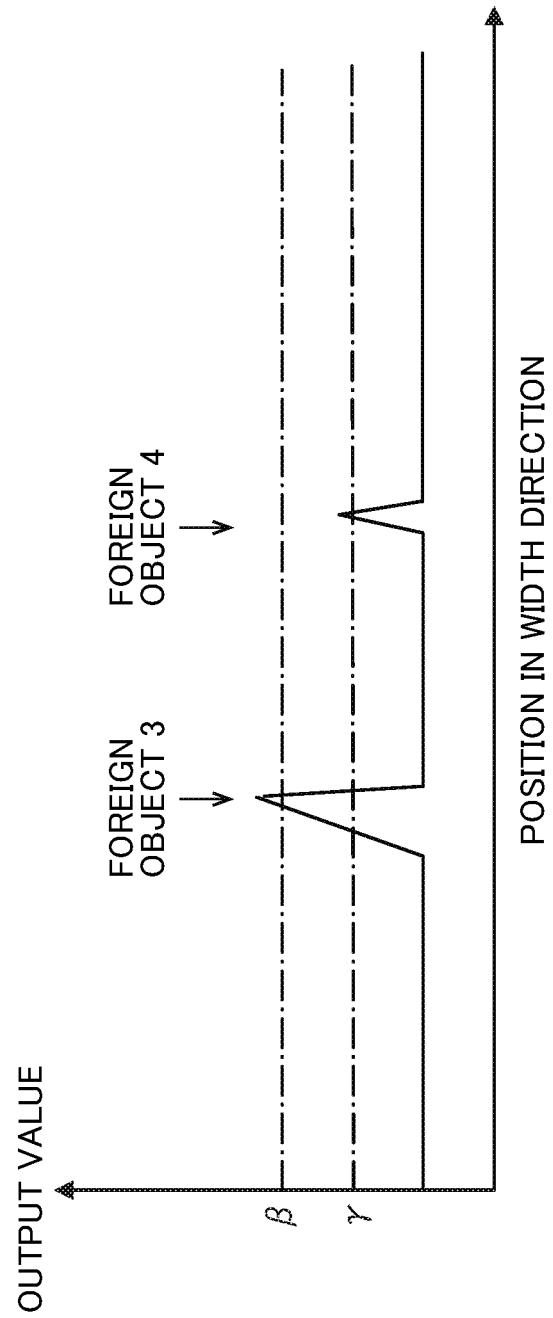
FIG. 30 is a view illustrating thresholds in edge detection processing and foreign object detection processing.

FIG. 30 is a view illustrating thresholds in edge detection processing and foreign object detection processing. FIG. 30 illustrates an output value of one line of pixels of certain light read by a pixel array of the light receiving device 212 at the time of foreign object detection processing. The horizontal axis indicates a position (coordinates) of each of pixels of the pixel array in the width direction, while the vertical axis indicates an output value of the pixel.

Solid lines in FIG. 30 indicate output values when foreign object detection processing is performed on certain foreign object 3 and foreign object 4. The output value attributed to foreign object 3 in FIG. 30 exceeds a threshold β and a threshold γ. In contrast, the output value attributed to foreign object 4 exceeds the threshold γ but does not exceed the threshold β. In a case where the first predetermined threshold being the threshold at the time of edge detection is the threshold β, the output value attributed to foreign object 4 does not exceed the threshold β, and thus would not cause an erroneous detection of the edge. However, in a case where the output value is close to the threshold β, there is a possibility of accidental failure of detection due to variation in reading operation. When sheet dust or the like is further accumulated in foreign object 4, the output value at the position of foreign object 4 gradually increases, and erroneous detection of the end portion of the sheet will eventually occur.

To overcome this, the second predetermined threshold is set to be smaller than the first predetermined threshold by setting the second predetermined threshold being the threshold at the foreign object detection to the threshold γ and setting the first predetermined threshold being the threshold at the edge detection to the threshold as illustrated in FIG. 30, This results in easier detection of foreign objects.

Figure 31:
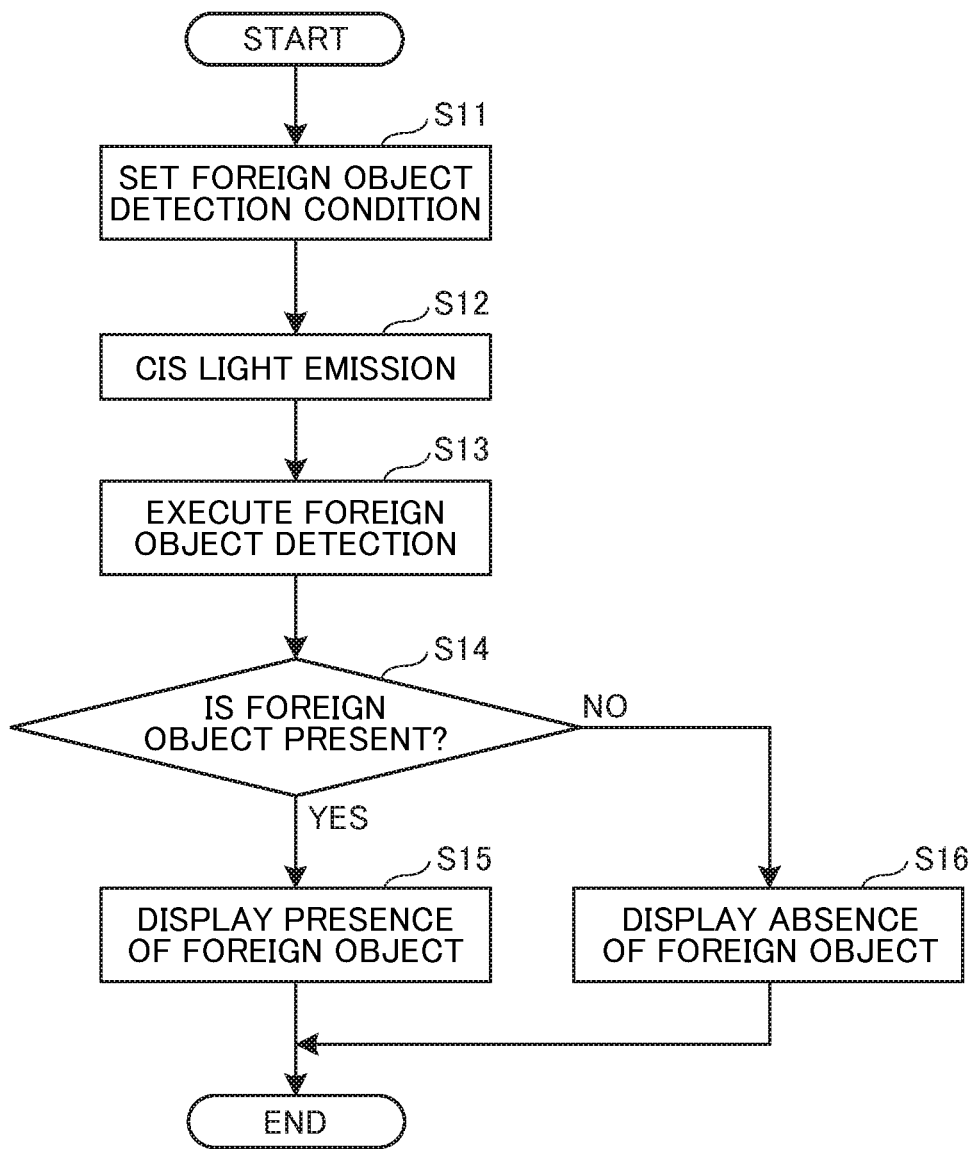
FIG. 31 is a flowchart illustrating a first example of foreign object detection processing.

FIG. 31 is a flowchart illustrating a first example of foreign object detection processing.

FIG. 31 illustrates, as an example, the flow executed in the ninth embodiment or the tenth embodiment. This is a flow to be started by the sensor device 210 in a state where no target object is present in the region where the edge of the target object is read. The flow may be started at a timing when a user or the like issues an instruction from the display panel 23 or the like, at a timing determined by the control device 300, or may be automatically started at a preset timing. The control device 300 determines that the target object is not present in the region where the sensor device 210 reads the edge of the target object at a timing when the sheet P has not been conveyed to the conveyance path, as an example. As another example, even in a case where the sheet P has been conveyed to the conveyance path, the control device 300 may determine that a timing when the sensor device 210 reads between a preceding sheet P and a subsequent sheet P as the state where the target object is not present in the region where the sensor device 210 reads the edge of the target object.

First, the condition setting unit 304 sets a foreign object detection condition (S11). The foreign object detection condition may be the same as the condition at the time of edge detection, or condition suitable for foreign object detection may be separately set. Next, the sensor device 210 causes the CIS to emit light on the basis of the set condition (S12). Subsequently, the threshold pixel detector 308*h* or 308*i* detects a threshold pixel (S13). The threshold pixel detector 308*h* or 308*i* next determines the presence or absence of foreign object (S14). In a case where it is determined in step S14 that there is a foreign object, the threshold pixel detector 308*h* or 308*i* causes the display panel 23 being a display unit to display the presence of the foreign object (S15), and finishes the flow. Meanwhile, in a case where it is determined in step S14 that there is no foreign object, the threshold pixel detector 308*h* or 308*i* causes the display panel 23 being the display unit to display the absence of foreign object (S16), and finishes the flow.

In a case where the foreign object detection flow is executed in the ninth embodiment, one of the foreign object detection conditions in step S11 is to be a condition set so as to increase the amount of the reflected light, as described in FIG. 28. In a case where the foreign object detection flow is executed in the tenth embodiment, one of the foreign object detection conditions in step S11 is to be a condition set so as to set the second predetermined threshold to be smaller than the first predetermined threshold, as described in FIG. 30.

Figure 32:
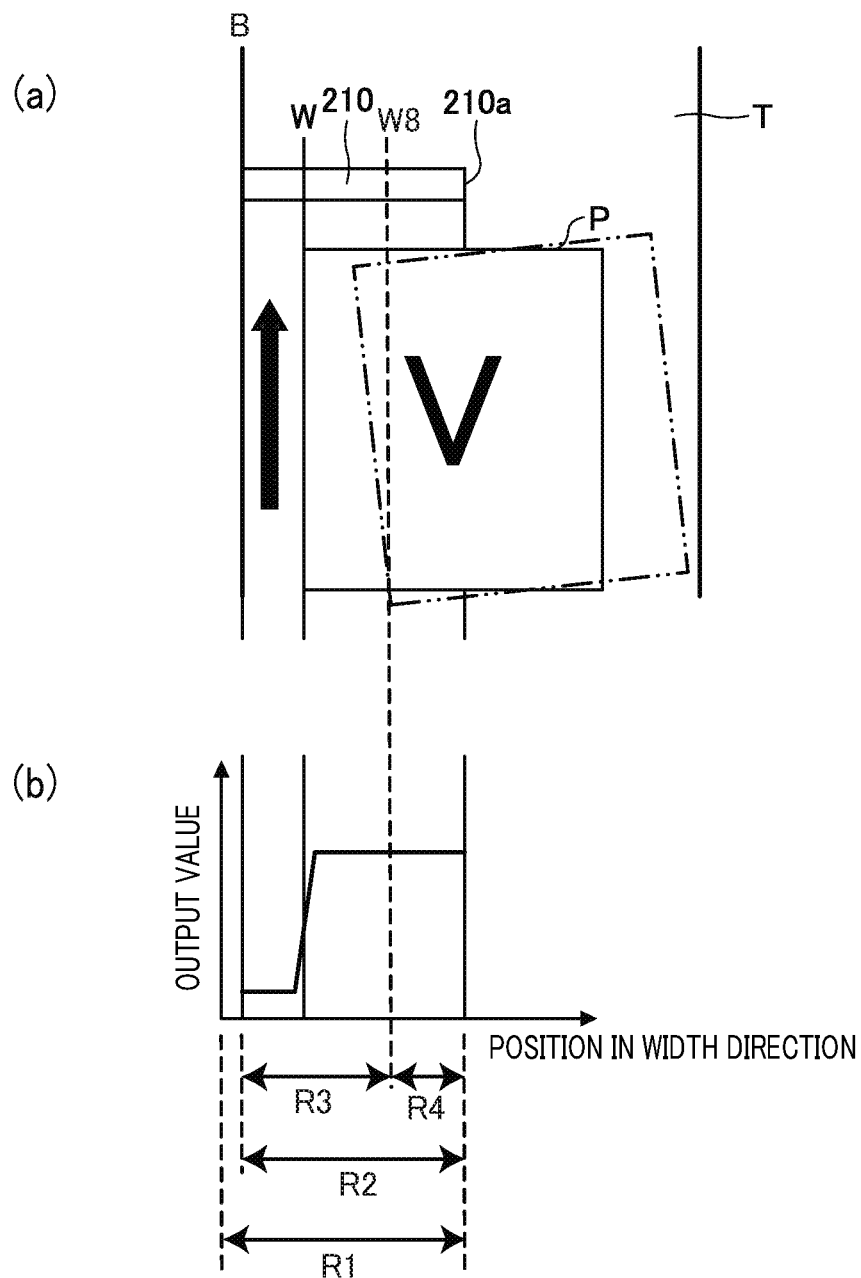
FIG. 32 is an illustration of a region read by a sensor device.

Here, a specific example of the determination of the presence or absence of foreign object in step S14 of FIG. 31 will be described with reference to FIG. 32. FIG. 32 is an illustration of a state where the edge position reading device 100 reads the edge position of the sheet P and illustrating the read data.

Part (a) of FIG. 32 illustrates a state where the sheet P is conveyed along a conveyance path T in a direction indicated by the thick black arrow, and an edge W of the sheet P is read by the sensor device 210. In part (a) of FIG. 32, in the design of the image forming apparatus 500, an end of the sheet when the edge of the sheet P is most shifted to the sensor device 210 side is indicated as B, and the edge position when the edge is shifted to the opposite side of B is indicated as W8. That is, in the design of the image forming apparatus 500, the sheet P would not shift beyond B toward the sensor device 210, or would not shift beyond W8 toward the sensor device 210.

Part (b) of FIG. 32 illustrates an output value of one line of pixels of certain light read by a pixel array of the light receiving device 212. The horizontal axis indicates a position (coordinates) of each of pixels of the pixel array in the width direction. The vertical axis indicates an output value of the pixel.

As described in FIGS. 7A to 7D, the amount of reflected light from the region where the sheet P is not present is small, and the output value of the pixel is small in the region to which light is emitted from the light source device 211. In contrast, the amount of reflected light from the region where the sheet P is present is increased by the reflection by the sheet P with a large output value of the pixel. Accordingly, the position in the width direction in which the output value of the pixel changes from a small value to a large value is detected, thereby making it possible to read the position of the edge W of the sheet P in the width direction.

Assuming that a region being a sensor detection region of the sensor device 210 is defined as a region R1 in FIG. 32, a region R2 obtained by excluding, from the region R1, a region beyond B being a region to which the sheet would not be conveyed, toward the sensor device 210, will be referred to as a "sheet conveyance region". The determination of the presence or absence of foreign object in step S14 is made such that it is determined as presence of a foreign object in a case where the foreign object is present in the sheet conveyance region, as an example.

Furthermore, in the design of the image forming apparatus 500, the region on the left side of W8 out of the region R2, namely, a region 3 is a region where there is a possibility that an edge portion can pass in a case where the sheet is shifted. Therefore, presence of a foreign object within this region might lead to erroneous detection of an edge. This region is referred to as a "pre-sheet-pass position region". A region R4 is a region in which the sheet is always conveyed even in a case where the sheet is shifted the most. The region R4 is referred to as a "sheet-pass position region". Even when a foreign object is present in the region R4, the sheet passes between the sensor device 210 and the foreign object, and thus no reflected light from the foreign object is received by the sensor device 210. Accordingly, erroneous detection of an edge is would not occur.

The condition setting unit 304 in each of embodiments can appropriately set the detection range of the threshold pixel as the region R1 to R4 or the like, as one of the conditions of each of the edge detection processing and the foreign object detection processing.

In other words, for example, in a case where there are threshold pixels in a predetermined region in the width direction set by the condition setting unit 304h and the condition setting unit 304i, the threshold pixel detector 308h and the threshold pixel detector 308i respectively determine that the output value of the pixel is attributed to foreign objects such as dirt, whereas the setting of the preliminarily set predetermined region in the width direction can be appropriately set using the regions R1 to R4.

Next, an example of the edge position reading device according to an eleventh embodiment will be described with reference to FIGS. 33 to 36. In the eleventh embodiment, the description of the same configuration as in the previously described embodiment may be omitted.

As described above, the edge position reading device has a possibility of erroneously detecting the edge position in a case where the output value of the pixel exceeds the threshold due to foreign objects such as dirt. In the present embodiment, such erroneous detection of the edge position based on the output value of the pixel of the foreign object such as dirt is prevented, and accurate edge position detection is enabled.

Figure 33:
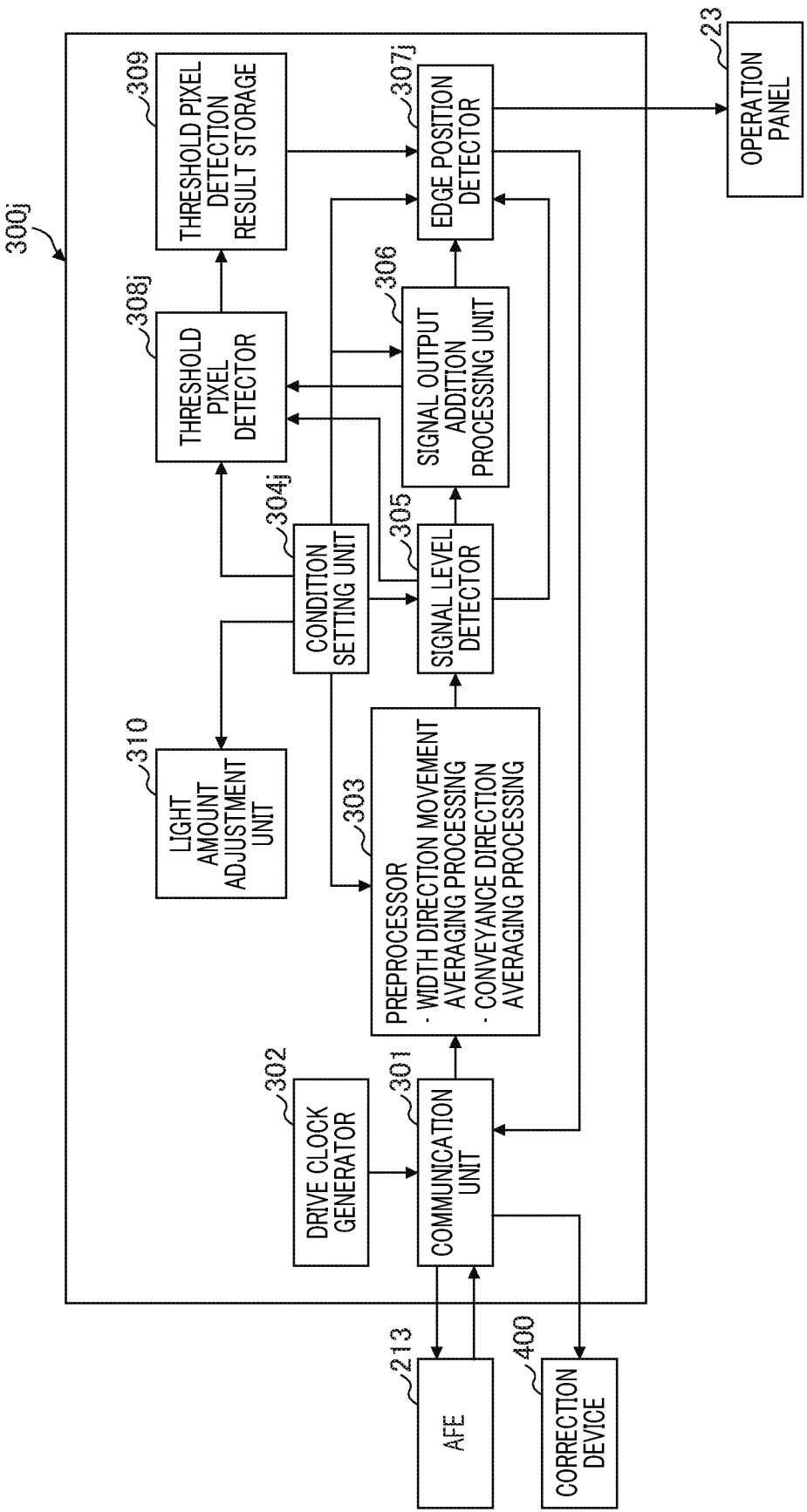
FIG. 33 is a block diagram illustrating a functional configuration of a control device in an edge position reading device according to an eleventh embodiment.

FIG. 33 is a block diagram illustrating an example of a functional configuration of a control device 300j of an edge position reading device 100j according to the present embodiment. The control device 300j includes a condition setting unit 304j, a threshold pixel detector 308j, and a threshold pixel detection result storage 309.

In the present embodiment, the condition setting unit 304j sets conditions for edge detection processing as conditions for foreign object detection processing. Note that the conditions at the time of edge detection processing can include various types of conditions such as the threshold at the time of edge detection and whether to perform signal addition, as described in FIG. 6. The present embodiment will be described on the assumption that there are seven different edge detection processing conditions N (N=0 to 6) illustrated in FIG. 34 as an example of conditions of the edge detection processing. As illustrated in FIG. 34, seven different conditions can be set as combinations of "emission amount" of the light source 201, "Presence or absence of RGB signal addition/detection color" of the sensor device 210, and "threshold" at edge detection. The condition setting unit 304j can also set the detection condition at the time of the foreign object detection processing similarly to the condition setting unit 304 of each of the embodiments described above.

Furthermore, the edge position detector 307j determines a position (coordinates) at which the output value of the adjacent pixel in the width direction changes from a value smaller than a first predetermined threshold to a value larger than the threshold, and outputs the determined position as an edge position of the sheet P. The edge position detector 307j is an example of "an edge position detector that detects an edge of a target object".

In the present embodiment, the threshold pixel detector 308j performs foreign object detection under the conditions at the time of edge detection processing set by the condition setting unit 304j. Subsequently, the threshold pixel detector 308j outputs a result of the foreign object detection executed under the condition at the time of the edge detection processing, to the threshold pixel detection result storage 309. Examples of the result of foreign object detection include, but are not limited to, the presence or absence of a threshold pixel (foreign object), the position of the threshold pixel (foreign object), or the number of threshold pixels (foreign object). The threshold pixel detection result storage 309 stores detection results output from the threshold pixel detector 308j.

Figure 35:
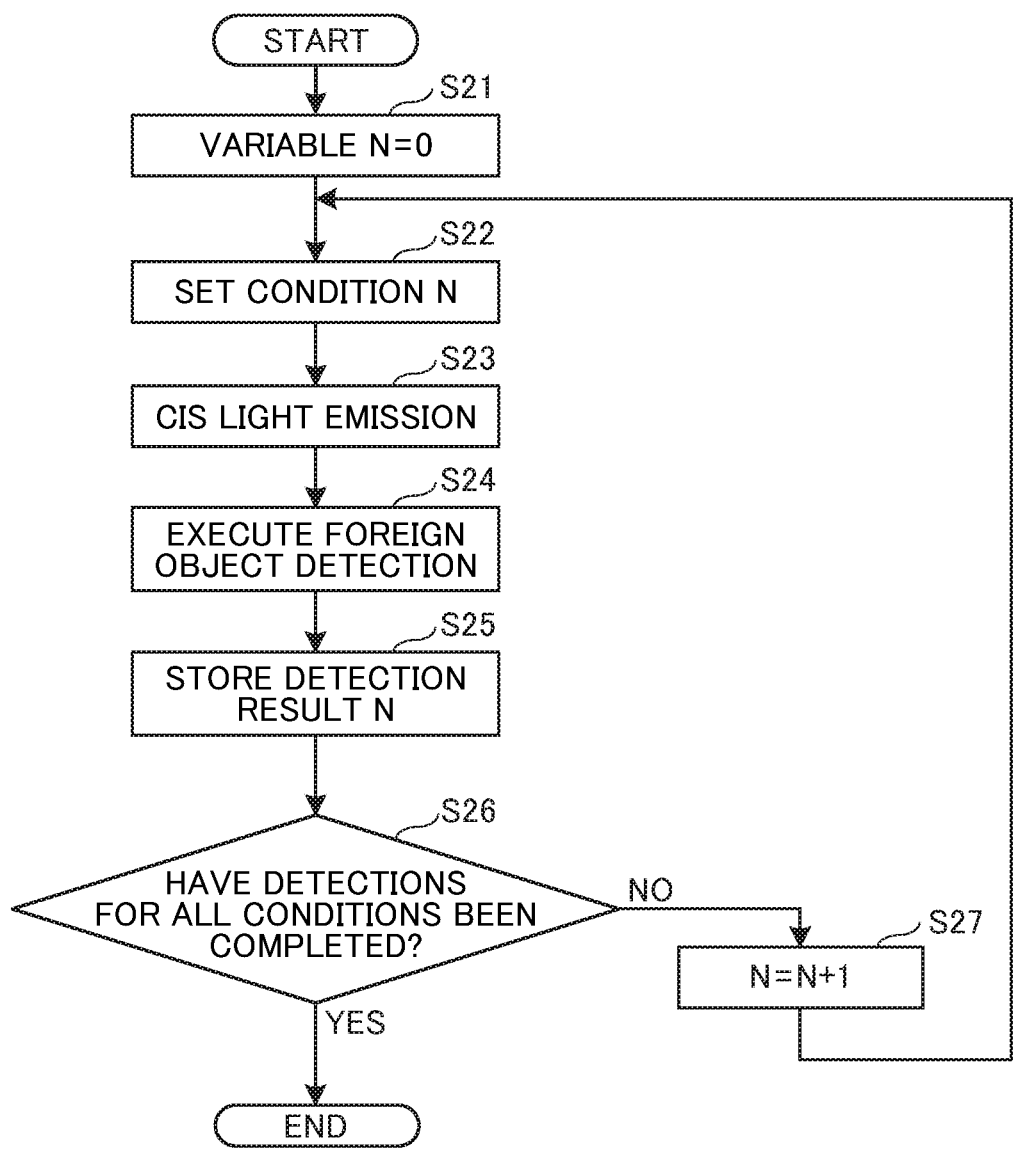
FIG. 35 is a flowchart illustrating a second example of foreign object detection processing.

FIG. 35 is a flowchart illustrating a second example of the foreign object detection processing.

This is a flow to be started by the sensor device 210 in a state where no target object is present in the region where the edge of the target object is read. The flow may be started at a timing when a user or the like issues an instruction from the display panel 23 or the like, at a timing determined by the control device 300, or may be automatically started at a preset timing. The control device 300 determines that the target object is not present in the region where the sensor device 210 reads the edge of the target object at a timing when the sheet P has not been conveyed to the conveyance path, as an example. As another example, even in a case where the sheet P has been conveyed to the conveyance path, the control device 300 may determine that a timing when the sensor device 210 reads between a preceding sheet P and a subsequent sheet P as the state where the target object is not present in the region where the sensor device 210 reads the edge of the target object.

First, the condition setting unit 304j sets a variable N to 0 (S21). Subsequently, the condition setting unit 304j sets an edge detection condition of condition N, which is initially N=0, as a foreign object detection condition (S22). Next, the sensor device 210 causes the CIS to emit light on the basis of the set conditions (S23). The threshold pixel detector 308j detects a threshold pixel (S24), and outputs a detection result to the threshold pixel detection result storage 309. The threshold pixel detection result storage 309 stores the variable N-th detection result (S25). The condition setting unit 304j determines whether the execution of the foreign object detection processing has been completed under all edge position detection conditions (S26), increments N to N+1 in a case where it is determined that the execution is not completed (S27), and processing returns to step S22. In a case where it is determined in step S26 that the processing has been completed (S26), the present flow is finished.

In the present embodiment, as described in step S22 and step S23, the edge position detector has a plurality of edge position detection conditions being detection conditions when the sensor device 210 detects the edge position in a state where the target object is not present in a region where the sensor device 210 reads the edge of the target object, and the pixel detector detects pixels at a predetermined threshold or more wider the same condition as each of the plurality of edge position detection conditions in a state where the target object is not present in the region where the sensor reads the edge of the target object. Accordingly, performing foreign object detection under a certain edge detection condition as in the present embodiment makes it possible to accurately grasp the foreign object detected when edge position detection is executed under the certain edge detection condition.

Figure 36:
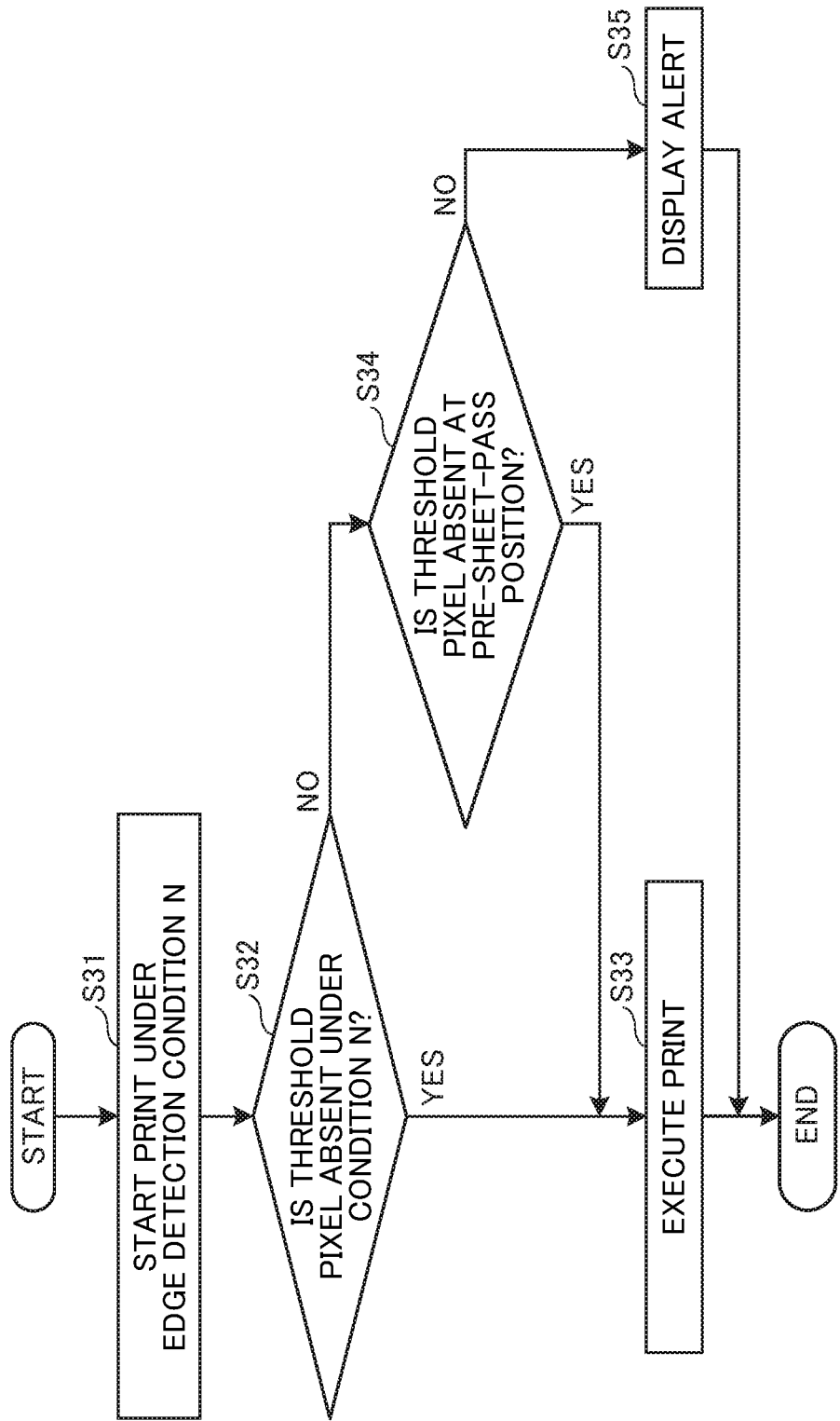
FIG. 36 is a flowchart illustrating an example of edge detection processing.

FIG. 36 is an edge detection flowchart. This can also be defined as an example of the edge position detection step S611 described in FIG. 6. First, printing is started under an edge position reading condition N (S31), The edge position detector 307j refers to the threshold pixel detection result storage 309, and determines presence or absence of a threshold pixel, that is, a foreign object in the threshold pixel detection result of the edge reading condition N (S32). In a case where a foreign object is absent in step S32, the edge position detector 307j determines to continue printing, that is, image formation by the image forming device and its accompanying edge position detection (S33). Printing is performed on the sheet being the edge position reading target, so as to complete the edge detection flow. In contrast, in a case where the threshold pixel is present in step S32, the processing proceeds to step S34.

As described above, in the present embodiment, image formation to the target object is executed in accordance with the detection result in which the pixel having a predetermined threshold or more is detected in advance under the edge position detection condition in the state where the target object is not present in the region where the sensor device 210 reads the edge of the target object. Accordingly, it is possible to prevent generation of a shift in the image forming position as a result of image formation performed in a state where erroneous detection has occurred in the edge position detection.

In step S34, the edge position detector 307j determines whether there is a threshold pixel at a pre-sheet-pass position in the sheet conveyance region (S34). In a case where there is no threshold pixel in the pre-sheet-pass position, printing, that is, image formation by the image forming device is continuously executed (S33), printing is completed on the sheet as an edge position reading target, so as to finish the edge detection flow. In contrast, in a case where it is determined in step S34 that there is a threshold pixel in a predetermined position, for example, in the pre-sheet-pass position region described in FIG. 31, an alert is to be displayed on the operation panel 23 or the like. This allows, as a result, the user to know that there is a possibility of erroneous detection of an edge, and then to take measures such as cleaning. Examples of the alert include, but are not limited to, a message indicating that there is a possibility of erroneous detection without performing cleaning of the foreign object.

In this manner, image formation is determined to be executed or not in accordance with the position of the threshold pixel in step S34, making it possible to prevent interruption of image formation as a result of frequent movement to step S35 including a case where there would be no influence on the edge detection processing.

Although the present edge detection flowchart is an example in which the presence or absence of the threshold pixel is determined in step S32 and the determination of the presence or absence of a foreign object to be cleaned for separate positions of the threshold pixel in step S34, it is also allowable to add another step, or immediately proceed to step S35 in a case where there is a threshold pixel in step S32 (in the case of NO).

Examples of edge position detection conditions include, but are not limited to, the light emission amount of CIS, which color of RGB is to be lighted as a detection color (including all color lighting), detection threshold (high/low) setting, as described in FIG. 34.

Performing foreign object detection using the condition for lighting individual color of RGB as an example of an edge detection condition would make it possible to obtain detailed information such as the position of the foreign object according to the color of the foreign object. In contrast, using the condition for lighting all the colors of RGB would make it possible to detect many foreign objects by one round of foreign object detection processing, as compared to the case of lighting individual color of RGB.

In addition, there are cases where the sensor cannot detect a foreign object due to a difference in relative position between the foreign object and each of the RGB sensors, or cases where the relationship between the color of the sensor and the color of the foreign object causes different sensitivities to a certain foreign object depending on the sensors. In that case, it is allowable to use the result of the foreign object detection processing performed under the condition that light is emitted from individual colors of RGB and select an edge detection condition using a color with no detection of foreign object out of the RGB colors to perform edge detection processing.

Figure 37:
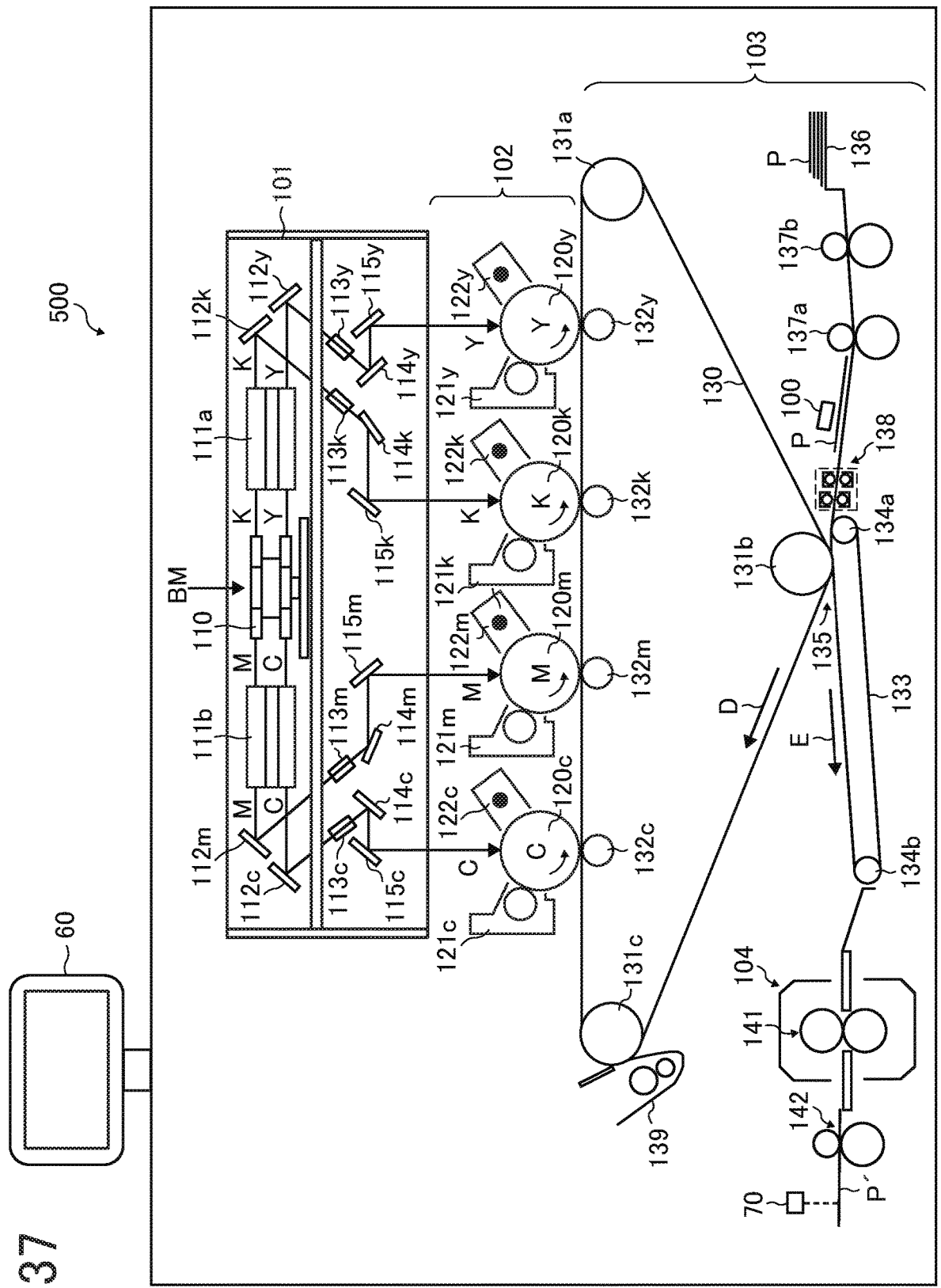
FIG. 37 is a view illustrating another configuration of an image forming apparatus having an edge position reading device.

FIG. 37 is a view illustrating another configuration of the image forming apparatus 500 including the edge position reading device 100.

The image forming apparatus 500 includes an exposure device 101, an image forming device 102, a transfer device 103, and a fixing device 104. There is provided an operation panel 60 on the top of the image forming apparatus 500.

The operation panel 60 as an example of the display unit receives various inputs corresponding to user's operation, and also displays various types of information (for example, information indicating the received operation, information indicating an operation status of the image forming apparatus 500, and the setting state of the image forming apparatus 500). Examples of the operation panel 60 include, but are not limited to, a liquid crystal display (LCD) equipped with a touch panel function. For example, the operation panel 23 may include an organic Electro-Luminescence (EL) display device equipped with a touch panel function. Furthermore, in addition to or instead of this, an operation unit such as a hardware key or a display unit such as a lamp may be provided.

The exposure device 101, the image forming device 102, the transfer device 103, and the fixing device 104 are hardware devices, as parts of a printer engine, each provided to implement a printer function, a copy function, a fax function, or the like, on the basis of instructions or the like input from the operation panel 60 or the like. That is, this corresponds to hardware such as a printer, a copier, a fax, and a scanner. Examples of applicable printer functions include, but are not limited to, an electrophotographic system and an inkjet system.

The image forming apparatus 500 may also have specific options such as a finisher for sorting printed sheets, or an auto document feeder (ADF) for automatically feeding a document. Hereinafter, operation of each of portions of the image forming apparatus 500 will be described.

The image forming device 102 includes a yellow (Y) photoconductor 120y, a black (K) photoconductor 120k, a magenta (M) photoconductor 120m, and a cyan (C) photoconductor 120c, each of which being an image bearer. The image forming device 102 also includes a yellow (Y) developing device 121y, a black (K) developing device 121k, a magenta (M) developing device 121m, and a cyan (C) developing device 121c, each of which being a developing device. The image forming device 102 further includes a yellow (Y) charger 122y, a black (K) charger 122k, a magenta (M) charger 122m, and a cyan (C) charger 122c, each of which being a charging device.

The transfer device 103 also includes an intermediate transfer belt 130, and a secondary transfer belt 133. The fixing device 104 includes a fixing member 141 and a discharge roller 142.

The exposure device 101 exposes photoconductors 120y to 120c of the image forming device 102, and emits writing light for writing a latent image based on the image data onto each of the photoconductors 120y to 120c. That is, the light beam is selectively emitted at the writing position based on an image pattern of the image data, with the writing light amount based on the image density. The writing light can be light from a laser light source or an LED light source. In the following, a case of using a laser light source including a laser diode (LD) will be described as an example.

First, a light beam BM emitted from a laser light source is deflected by a polygon mirror 110, and enters scanning lenses 111a and 111b each of which including an fθ lens. A configuration and operation of emitting the light beam BM from the laser light source will be described below.

The light beams are generated in numbers corresponding to the individual color images of yellow (Y), black (K), magenta (M), and cyan (C), and each of the beams passes through the scanning lenses 111a and 111b, and then, is reflected on reflection mirrors 112y to 112c.

For example, the yellow light beam Y is transmitted through the scanning lens 111a, reflected by the reflection mirror 112y, and then is incident on a WTL lens 113y. The same is true for the light beams K, M, and C of the colors of black, magenta, and cyan, respectively, and thus, the description thereof will be omitted.

The WTL lenses 113y to 113c shape the incident light beams Y to C, respectively, and then deflect the light beams Y to C to the reflection mirrors 114y to 114c, respectively. The individual light beams Y to C are further reflected by the reflection mirrors 115y to 115c, respectively, and are emitted onto the photoconductors 120y to 120c respectively as the light beams Y to C used for exposure.

The emission of the light beams Y to C respectively onto the photoconductors 120y to 120c is synchronized in timing concerning a main-scanning direction and a sub-scanning direction with respect to the photoconductors 120y to 120c. The photoconductor is, for example, in the shape of a long drum in the main-scanning direction, and may be referred to as a photosensitive drum.

Hereinafter, the main-scanning direction with respect to the photoconductors 120y to 120c is defined as the scanning direction of the light beam, and the sub-scanning direction is defined as a direction orthogonal to the main-scanning direction, that is, the rotating direction of the photoconductors 120y to 120c. The main-scanning direction corresponds to the sheet width direction, while the sub-scanning direction corresponds to the sheet conveyance direction.

The photoconductors 120y to 120c each include a photoconductive layer including at least a charge generation layer and a charge conveyance layer on a conductive drum such as aluminum.

The photoconductive layers are individually provided corresponding to the photoconductors 120y to 120c, and a surface charge is applied based on a charging bias by the chargers 122y to 122c as a charging device including a corotron charger, a scorotron charger, or a charging roller.

Electrostatic charges respectively applied on the photoconductors 120y to 120c respectively by the chargers 122y to 122c are exposed based on the image pattern respectively by the light beams Y to C as writing light. Accordingly, an electrostatic latent image is formed on a scanned surface of each of the chargers 122y to 122c, respectively.

The electrostatic latent images formed on the scanned surfaces of the photoconductors 120y to 120c are respectively developed by the developing devices 121y to 121c being developing units including a developing sleeve to which a developing bias is applied, a toner supply roller, and a regulation blade, and then, a toner image is formed on each of the scanned surfaces of the photoconductors 120y to 120c, respectively.

The developers carried on the surfaces to be scanned of the photoconductors 120y to 120c are transferred onto the intermediate transfer belt 130 moving in a direction of arrow D respectively by conveyance rollers 131a to 131c. 132y to 132c denote primary transfer rollers for the photoconductors 120y to 120c, respectively.

The intermediate transfer belt 130 as an image bearer is conveyed to a secondary transfer position 135 as an example of an image forming portion in a state where Y, K, M, and C developers transferred from scanned surfaces of the photoconductors 120y to 120c are carried.

The secondary transfer belt 133 is stretched over conveyance rollers 134a and 134b, and is further conveyed in a direction of arrow E by the rotation of the conveyance rollers 134a and 134b.

From the sheet tray 136 being an example of a storage unit such as a sheet feeding cassette, the sheet P being a target object such as high quality sheet and a plastic sheet is conveyed by conveyance rollers 137a and 137h toward the secondary transfer position 135.

The sheet edge position reading device 100 is provided on a conveyance path to the secondary transfer position 135. The edge position reading device 100 reads an edge position of the sheet P to be conveyed, and grasps a conveyance position of the sheet P. Then, a sheet misregistration correction device 138 as a correction device 400 is provided in the downstream of the edge position reading device 100 on the conveyance path to the secondary transfer position 135. For example, the sheet misregistration correction device 138 includes a plurality of roller pairs sandwiching the sheet P, controls the plurality of roller pairs in accordance with the conveyance position of the sheet P grasped by the edge position reading device 100, and adjusts the conveyance angle of the sheet P to correct the image forming position.

At the secondary transfer position 135, a secondary transfer bias is applied to transfer the toner image carried on the intermediate transfer belt 130 onto the sheet P held by attraction on the secondary transfer belt 133. The sheet P is conveyed in a direction orthogonal to the main-scanning direction. That is, the toner image formed on the surface of the intermediate transfer belt 130 is transferred to the sheet P at the secondary transfer position 135 being an example of the image forming portion between the intermediate transfer belt 130 and the secondary transfer belt 133.

The sheet P is supplied to the fixing device 104 together with the conveyance of the secondary transfer belt 133.

The fixing device 104 includes a fixing member 141 such as a fixing roller containing silicone rubber or fluorine rubber, and pressurizes and heats the sheet P and the toner image. A sheet P' after image formation (hereinafter referred to as the sheet P') is discharged by the discharge roller 142 to the outside of the fixing device 104.

The image density of the image on the sheet P' as an image bearer discharged from the fixing device 104 is detected by the density sensor 70. On the basis of the image density detected by the density sensor 70, it is possible to perform uneven density correction in the main-scanning direction.

The intermediate transfer belt 130 after transfer of the multicolor developer image has its transfer residual developer removed by the cleaning unit 139 including a cleaning blade, and thereafter, is supplied to the next image forming process.

In the above-described printer engine operation, the rotational directions of the photoconductors 120y to 120c each being an image bearer, the conveyance direction of the intermediate transfer belt 130 being an image bearer, and the conveyance directions of the sheet P and the sheet P' each being an image bearer are all orthogonal to the main-scanning direction, being the same as the sub-scanning direction.

Note that although the density sensor 70 is disposed in the downstream of the fixing device in FIGS. 2A and 2B, it is allowable to arrange the density sensor 70 in the vicinity of the conveyance roller 131a, for example. With this arrangement, it is possible to detect the image density of the image formed on the intermediate transfer belt 130.

Similarly to the image forming apparatus 500 illustrated in FIG. 1, the image forming apparatus 500 illustrated in FIG. 36 operates in accordance with an instruction from the control device 300. In the image forming apparatus 500 of FIG. 1, the edge position reading device 100 is installed in the downstream of the fixing device 104 to read the edge of the sheet on which the image is formed. In contrast to this, in the image forming apparatus 500 illustrated in FIG. 36, the edge position reading device 100 is provided in front of the secondary transfer position 135 being an image forming portion, that is, read the edge of the sheet P before image formation. In this case, it is similarly possible to achieve an effect of accurately reading the edge of the sheet P.

While the image forming apparatus 500 includes one edge position reading device 100 in FIGS. 1 and 36, it may include a plurality of edge position reading devices 100.

The above-described embodiments are illustrative and do not limit the present invention. Thus, numerous additional modifications and variations are possible in light of the above teachings. For example, elements and features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading device configured to detect an edge position of a target object to be conveyed in a conveyance direction, the edge position being a position of an edge of the target object in a width direction intersecting the conveyance direction, the reading device comprising:
a sensor including a pixel array, the pixel array including a plurality of elements arranged in the width direction and configured to output detection signals, the sensor disposed to read the edge position;
an adder configured to add the detection signals output from the plurality of elements of the pixel array at respective positions in the width direction; and
an edge position detector configured to detect the edge position of the target object in the width direction of the target object on basis of a position at which an output of the adder changes to a value larger than a threshold,
wherein each of the plurality of elements is configured to output a detection signal based on a reception amount of light in one of different wavelength bands,
the reading device further comprising a pixel detector configured to detect a pixel having a value larger than another threshold in the output of the adder in a state where the target object is not present in a region where the sensor reads the edge position of the target object.

2. The reading device according to claim 1, wherein the pixel detector is configured to cause a display to display an indication that there is a foreign object on basis of a detection result obtained by the pixel detector.

3. The reading device according to claim 1, wherein the sensor includes a light source device configured to emit the light,
the pixel array is configured to receive reflected light of the light emitted from the light source device,
the detection signal is a detection signal based on a reception amount of the reflected light, and the light emitted from the light source device in a case of detecting a pixel in a state where the target object is not present is greater than the light emitted from the light source device in a case where the edge position detector detects the edge position.

4. The reading device according to claim 1, wherein the sensor includes a light source device configured to emit the light,
the pixel array is configured to receive reflected light of the light emitted from the light source device,
the detection signal is a detection signal based on a reception amount of the reflected light, and
the detection signal based on the reception amount in a case of detecting a pixel in a state where the target object is not present is greater than the detection signal based on the reception amount in a case where the edge position detector detects the edge position.

5. The reading device according to claim 1, wherein said another threshold is smaller than the threshold.

6. The reading device according to claim 1, wherein the edge position detector has a plurality of edge position detection conditions being detection conditions for the edge position detector to detect the edge position, and
the pixel detector is configured to detect the pixel having the value larger than said another threshold in the output of the adder under a same condition as each of the plurality of edge position detection conditions in a state where the target object is not present in a region where the sensor reads the edge position of the target object.

7. An image forming apparatus comprising:
the reading device according to claim 6; and
an image forming device configured to form an image on the target object in accordance with a detection result obtained by preliminarily detecting, with the pixel detector, the pixel having the value larger than said another threshold in the output of the adder under one of the edge position detection conditions in the state where the target object is not present in the region where the sensor reads the edge position of the target object.

8. The image forming apparatus according to claim 7, wherein the image forming device is configured to execute image formation in a case where the pixel having the value larger than said another threshold in the output of the adder has not been preliminarily detected in the detection result.

9. The image forming apparatus according to claim 7, wherein the pixel detector is configured to execute display on a display unit in accordance with a position of the pixel having the value larger than said another threshold in the output of the adder, the position indicated by the detection result.

* * * * *